US012693547B2

(12) United States Patent
Guilloux et al.

(10) Patent No.: US 12,693,547 B2
(45) Date of Patent: Jul. 28, 2026

(54) METHOD FOR DETERMINING AN OPTICAL LENS

(71) Applicant: Essilor International, Charenton-le-Pont (FR)

(72) Inventors: Cyril Guilloux, Charenton-le-Pont (FR); Alain Goulet, Charenton-le-Pont (FR); Samy Hamlaoui, Charenton-le-Pont (FR); Asma Lakhoua, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 869 days.

(21) Appl. No.: 17/786,458

(22) PCT Filed: Dec. 18, 2020

(86) PCT No.: PCT/EP2020/087223
§ 371 (c)(1),
(2) Date: Jun. 16, 2022

(87) PCT Pub. No.: WO2021/123308
PCT Pub. Date: Jun. 24, 2021

(65) Prior Publication Data
US 2023/0050801 A1 Feb. 16, 2023

(30) Foreign Application Priority Data
Dec. 20, 2019 (EP) ..................................... 19306716

(51) Int. Cl.
*G02C 7/02* (2006.01)
(52) U.S. Cl.
CPC ..................................... *G02C 7/027* (2013.01)
(58) Field of Classification Search
CPC ............ G02B 27/0012; G02B 27/0025; G02B 27/005; G02C 7/027; G02C 7/028;
(Continued)

(56) References Cited

U.S. PATENT DOCUMENTS

| | | | |
|---|---|---|---|
| 6,382,789 B1 | 5/2002 | Baudart. et al. | |
| 7,731,359 B2 | 6/2010 | Guilloux et al. | |
| 2015/0293377 A1* | 10/2015 | Allione .................. | G02C 7/061 351/159.74 |
| 2021/0311325 A1 | 10/2021 | Marin et al. | |

FOREIGN PATENT DOCUMENTS

| | | |
|---|---|---|
| CN | 101075021 A | 11/2007 |
| CN | 107003540 A | 8/2017 |

(Continued)

OTHER PUBLICATIONS

Computer Aided Lens design (Year: 1998).*

(Continued)

*Primary Examiner* — Travis S Fissel
(74) *Attorney, Agent, or Firm* — Oblon, McClelland, Maier & Neustadt, L.L.P.

(57) ABSTRACT

A method for determining an optical lens adapted for a wearer and optimized for at least a given optical criterion having a target value around a specific gaze direction. The method includes determining an intermediate optical lens by optimizing, using an optimization function, an initial optical lens so that the difference between the value of the at least given optical criterion of the intermediate optical lens and the target value of gaze directions around a specific gaze direction is smaller than or equal to a threshold value, and determining the optical lens by optimizing the intermediate optical lens so as to obtain the largest zone of gaze directions around the specific gaze direction for which the difference between the value of the at least given optical criterion and the target value around the specific gaze direction is smaller than or equal to the threshold value.

15 Claims, 19 Drawing Sheets

(58) Field of Classification Search
   CPC .......... G02C 7/025; G02C 7/02; G02C 7/024;
           G02C 7/04; G02C 7/063; G02C 7/041;
           G02C 7/06; G02C 7/061; G02C 7/065;
                   G02C 7/066; G02C 7/068
   USPC .................................................... 351/159.74
   See application file for complete search history.

(56)                References Cited

FOREIGN PATENT DOCUMENTS

WO     WO-2014199894 A1 * 12/2014  ........... B67D 1/0004
WO     WO 2016/091853 A1    6/2016
WO     WO 2016/146590 A1    9/2016

OTHER PUBLICATIONS

System for Ophthalmic Dispensing. Chapter 18 p. 402-429. (2007). Elsevier. (Year: 2007).*
Brooks, Clifford W. e al., "Chapter 18: Lens Design," *System for Ophthalmic Dispensing*, Jan. 1, 2007, pp. 402-430, 29 pages.
Meister, Darryl, "Zeiss Individual Progressive Lenses: The Optics of Truly Customized Progressive Lenses," *Personalized Lenses by Zeiss*, Sep. 27, 2009, pp. 1-8.
Kelley, C.T., "Iterative Methods for Optimization," Society for Industrial and Applied Mathematics, Apr. 10, 2001, 188 pages.
International Search Report and Written Opinion mailed on Apr. 15, 2021 in PCT/EP2020/087223 filed on Dec. 18, 2020 (13 pages).
Chinese Office Action issued Jan. 3, 2024 in Chinese Application No. 202080081039.4 with English translation, 42 pgs.

* cited by examiner

METHOD FOR DETERMINING AN OPTICAL LENS

TECHNICAL FIELD

The invention relates to a method implemented by computer means for determining an optical lens adapted for a wearer and optimized for at least a given optical criterion having a target value.

BACKGROUND OF THE INVENTION

It is known to design an optical lens based on a target optical lens. The target optical lens is a virtual lens which has an optimal optical function. The aim is to design an optical lens which tends as much as possible to have an optical function similar to the one of the target optical lens.

The ophthalmologist provides the wearer with a prescription. The wearer provides the prescription to a lens provider so has to receive an optical lens adapted to his prescription.

However, optical lenses may have a restricted zone through which the wearer can gaze in a comfortable manner.

There is a need for a method to determine optical lenses having a larger zone through which the wearer can seek.

SUMMARY OF THE INVENTION

To this end, the invention proposes a method, for example implemented by computer means for determining an optical lens adapted for a wearer and optimized for at least a given optical criterion having a target value around a specific gaze direction, the method comprises:

obtaining an initial optical lens having in a specific gaze direction a prescription of the wearer in given wearing condition;

determining an intermediate optical lens by optimizing, using an optimization function, the initial optical lens so that the difference between the value of the at least given optical criterion of said intermediate optical lens and the target value of gaze directions around the specific gaze direction is smaller than or equal to a threshold value, determining the optical lens by optimizing the intermediate optical lens so as to obtain the largest zone of gaze directions around the specific gaze direction for which the difference between the value of the at least given optical criterion and the target value around the specific gaze direction is smaller than or equal to the threshold value.

Advantageously, using the proposed method enable to maximize the zone of gaze directions around a specific gazing direction on an optical lens, where at least an optical criterion is close to a target value. The determined optical lens is an optical lens providing a maximized zone of gaze directions around a specific gaze direction, through which the wearer can comfortably seek.

According to further embodiments which can be considered alone or in combination:

the initial optical lens has in the specific gaze direction the prescription of the wearer in given wearing condition for a given object distance, when determining the intermediate optical lens, the initial lens is optimized for said object distance and when determining the optical lens, the intermediate optical lens is optimized for said object distance, and/or, the at least given optical criterion is the optical power and/or, the at least given optical criterion is the astigmatism and/or the at least given optical criterion is the acuity and/or the at least given optical criterion is the distortion, and/or, the specific gaze direction is the primary gaze direction, and/or, the optimization function used when determining the intermediate optical lens comprises a weighted cost function dependent on the gaze direction with a decreasing weight when the angle formed by a gaze direction and the specific gaze direction increases, and/or, a penalization function is added to the optimization function used when determining the intermediate optical lens so as to ensure that in a defined zone of gaze directions around the specific gaze direction, the difference between the value of the at least given optical criterion of said intermediate optical lens and the target value around the specific gaze direction is smaller than or equal to the threshold value, and/or, the intermediate optical lens is determined by optimizing at least one surface of the initial optical lens, and/or, the intermediate optical lens is determined by adding an optimized layer to at least one surface of the initial optical lens, and/or, the intermediate optical lens is determined by adding a Zernike layer to at least one surface of the initial optical lens, and/or, the Zernike layer has an order greater than or equal to 4, and/or, the optical lens is determined by optimizing at least one surface of the intermediate optical lens, and/or, the optical lens is determined by adding a Zernike layer to at least one surface of the intermediate optical lens, and/or, the Zernike layer has an order smaller than or equal to 10, and/or, the optimization of the intermediate optical lens comprises a derivative-free optimization, and/or, the zone of gaze directions around the specific gaze direction is centered on the specific gaze direction, and/or, the zone of gaze directions around the specific gaze direction has the shape of a spectacle frame selected by the wearer and the size of the zone of gaze directions is controlled using a homothetic transformation of said shape of a spectacle frame, and/or wherein the threshold value is standard or customized depending on the wearer, and/or the optical lens is an ophthalmic lens, and/or the optical lens is a single vision lens and/or, the optical lens is a multifocal lens, for example a progressive addition lens and/or, the threshold value is defined by at least one wearer specific sensitivity parameter relative to the optical criterion, and/or the specific sensitivity relative to the optical criterion corresponds to the tolerance of a wearer to a deviation of the optical criterion.

The invention will be better understood as it will be described in the detailed description.

3

Figure 3:
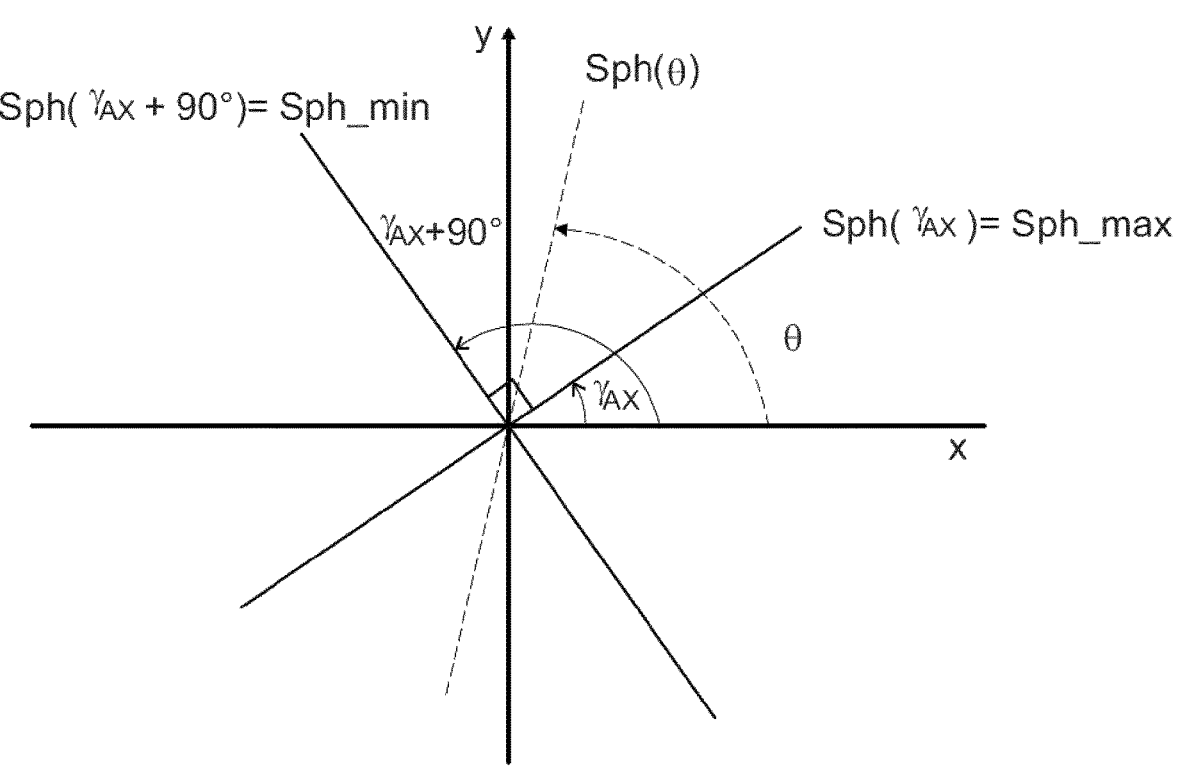
Figure 4:
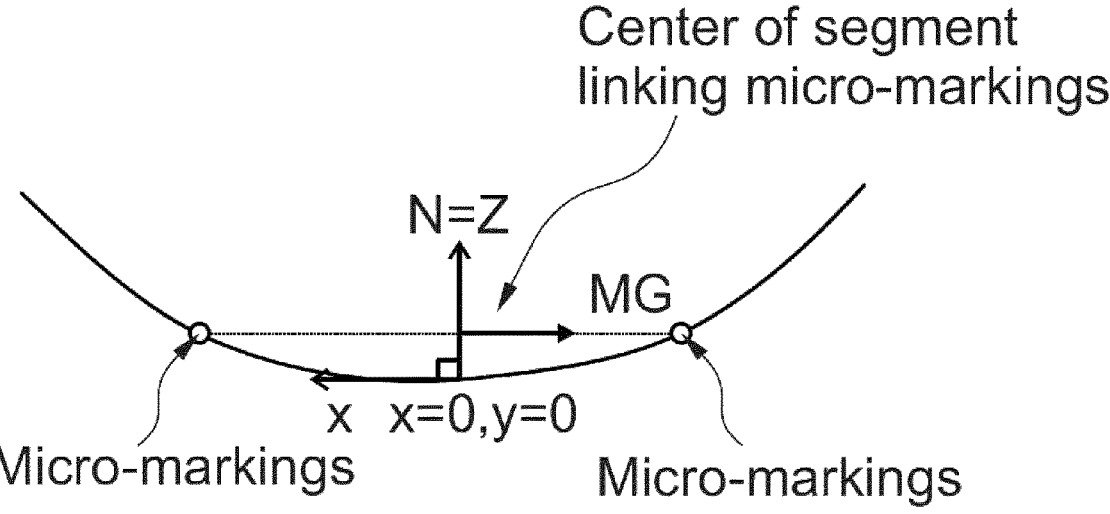
Figure 5A:
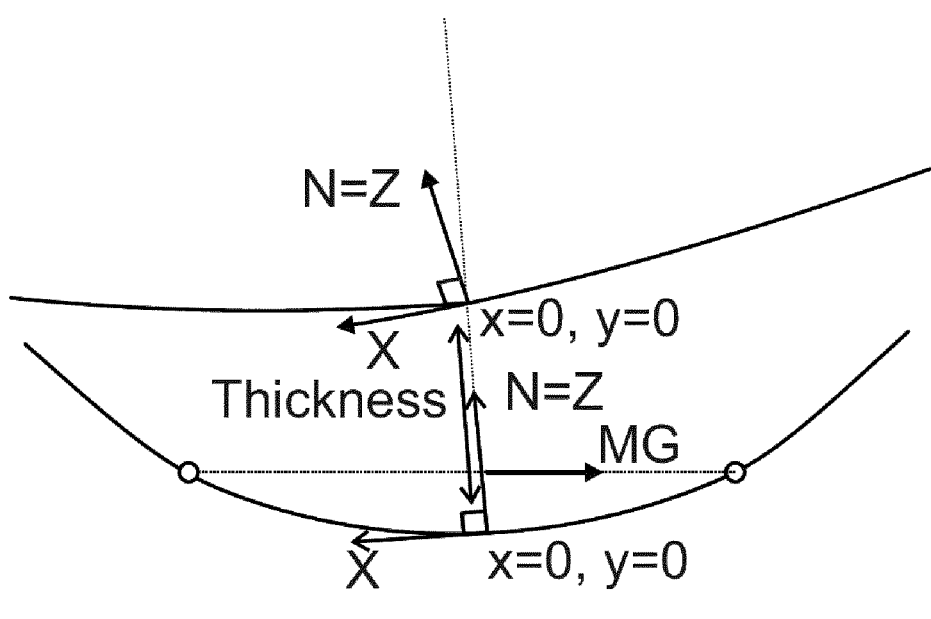
Figure 5B:
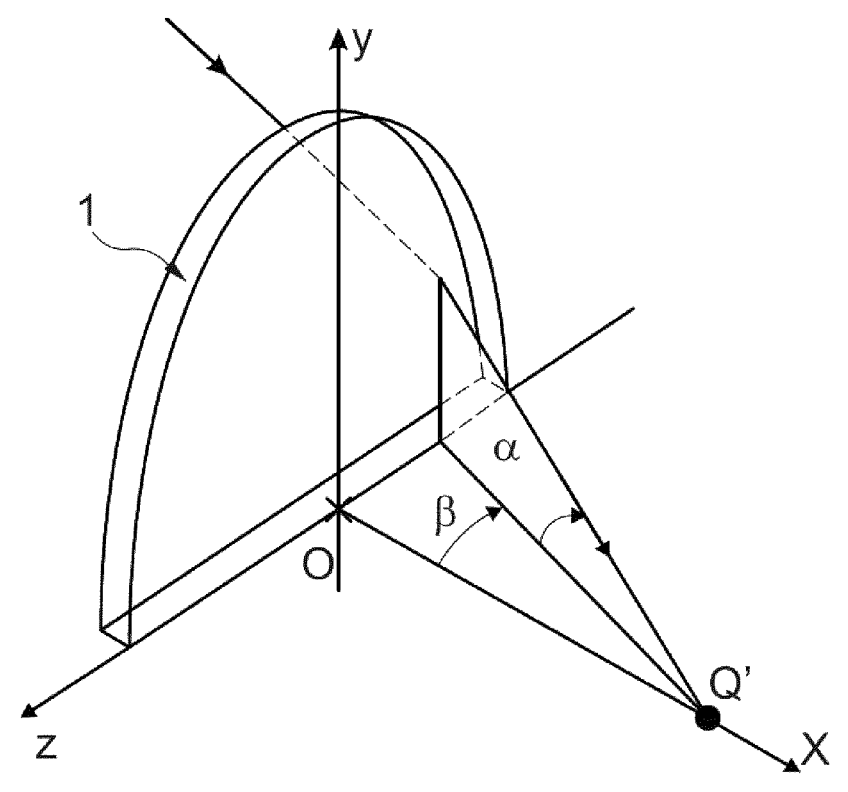
Figure 5C:
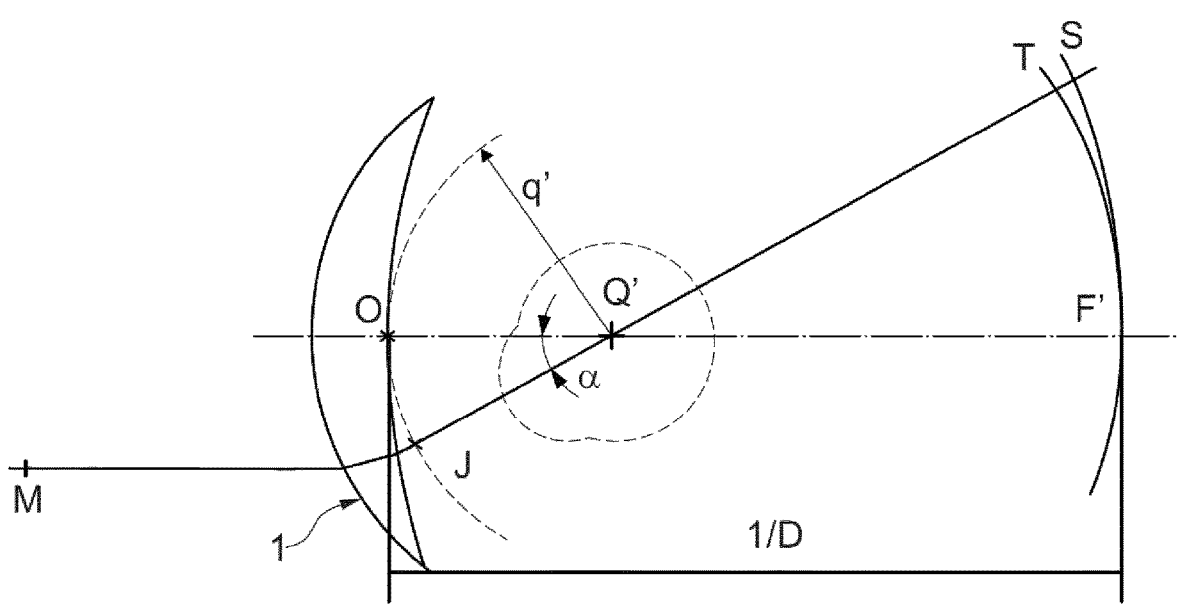
Figure 5D:
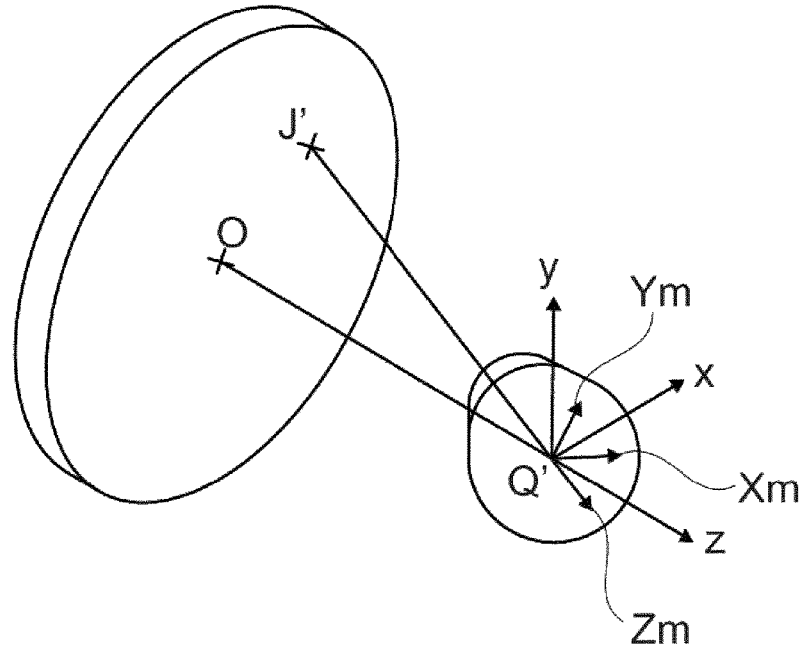
Figure 6:
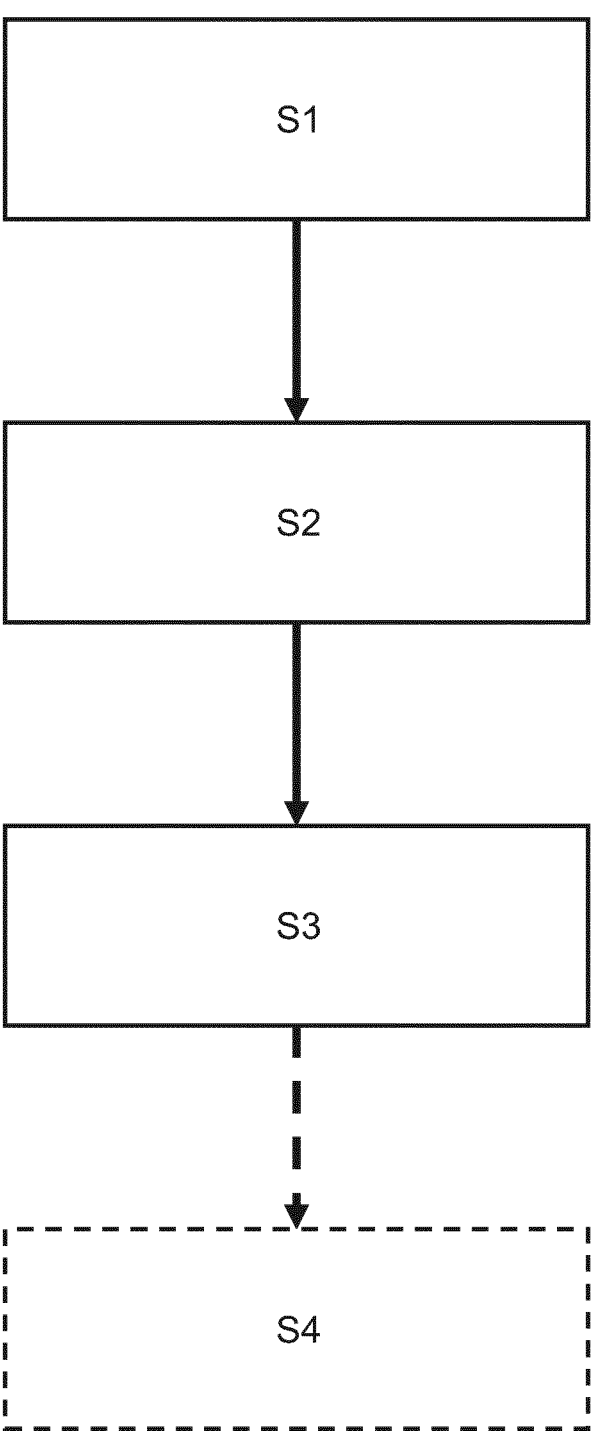

FIG. 3 illustrates the local sphere along any axis at a point on a surface;

FIGS. 4 and 5*a* show referential defined with respect to micro-markings, for a surface bearing micro-markings and for a surface not bearing the micro-markings respectively;

FIGS. 5*b* and 5*c* show, diagrammatically, optical systems of eye and ophthalmic lens;

FIG. 5*d* shows a ray tracing from the center of rotation of the eye;

FIG. 6 shows a flowchart according to the description of the invention; and

FIGS. 7 to 20 show optical power and unwanted astigmatism in gaze direction diagrams of an Tscherning optical lens and an optimized optical lens according to the description of the invention

DETAILED DESCRIPTION OF THE INVENTION

The disclosure relates to a method, for example implemented by computer means, for determining an optical lens adapted for a wearer and optimized for at least a given optical criterion having a target value.

An optical lens refers to any optical element having an optical function, such as ophthalmic lenses providing a correction to a wearer. The optical lens is adapted to the wearer prescription and can be adapted to the wearing condition of the wearer. The optical lens may refer here to a single vision lens or a multifocal optical lens, for example a progressive addition lens.

Further, an optical lens is generally manufactured in accordance with wearer specifications. In the case, for example, of an ophthalmic lens for the correction or improvement of eyesight, the ophthalmic lens is manufactured according to a wearer prescription corresponding to the visual requirements of that wearer. In addition, the shape and size of the spectacle frame supporting the ophthalmic lens may be taken into account. At least one of the surfaces of the ophthalmic lens is processed to provide in combination with the opposite surface an optical function according to the wearer prescription. The contour of the ophthalmic lens may be edged according to the shape of the spectacle frame on which the ophthalmic lens is to be mounted.

An optical lens is generally manufactured from an optical lens blank such as a semi-finished lens blank. A semi-finished lens blank generally has two opposing surfaces at least one of which is unfinished.

Generally, the semi-finished lens blank is selected from a set of semi-finished lens blanks based on the prescription of the wearer.

The optical lens may be a single vision lens. A single vision lens is designed to have a single sphero-cylindrical power that corresponds to the prescription at a reference point. When the optical lens is a single vision lens, the reference point may be the control point, for example the fitting cross or prism reference point.

The "fitting cross" is a temporary marking written on the finished surface of a semi-finished lens blank and on the finished surface of an optical lens. If the temporary markings are absent or have been erased, it is always possible for a skilled person to position the control points on the lens by using a mounting chart, technical documentation from the manufacturer and/or permanent micro-markings when they exist.

The optical lenses of the set of ophthalmic lenses may be multifocal lenses. A multifocal lens is designed to have more than one power. For example, multifocal lenses include bifocals, trifocals and progressive addition lenses.

When the ophthalmic lens is a progressive addition lens the primary reference point may be the far vision control point. When the ophthalmic lens is designed for near or intermediate vision, the primary reference point may be the near vision control point. Other reference points are the prism reference point, the fitting cross and possibly the secondary reference point. The fitting cross may be determined from the position of the prism reference point, for example the fitting cross is located 4 mm above the prism reference point when the lens is progressive addition lens.

Furthermore, when the ophthalmic lens is a progressive addition lens, it comprises:

a distance vision primary reference point, a near vision secondary reference point, a main line starting from one end of the zone of optical interest, ending on the opposite end of the zone of optical interest and passing through the primary and secondary reference points.

A progressive addition lens comprises at least one but preferably two non-rotationally symmetrical non spherical surfaces, for instance but not limited to, progressive surface, regressive surface, toric or atoric surfaces.

Standard or usual wearing conditions are to be understood as the position of the optical lens in relation to the eye of a standard wearer, notably defined with the fitting cross intersecting the primary viewing direction, a distance between the center of rotation of the eye and the first major surface of the lens of 25.5 mm, a pantoscopic angle of 8° and a wrap angle of 0°.

The pantoscopic angle is the angle in the vertical plane between the optical axis of the optical lens and the visual axis of the eye in the primary position, usually taken to be the horizontal.

The wrap angle is the angle in the horizontal plane between the optical axis of the optical lens and the visual axis of the eye in the primary position, usually taken to be the horizontal.

Other wearing conditions may be used. Wearing conditions may depend on the wearer and may be calculated from a ray-tracing program, for a given lens.

The optical criteria can be defined as a parameter based on which the optimization of the lens is determined. The optical criteria can be at least one parameter among the optical power, the astigmatism, the acuity, and the distortion.

As is known, a minimum curvature CURVmin is defined at any point on a non spherical surface by the formula:

$$CURV_{min} = \frac{1}{R_{max}}$$

where Rmax is the local maximum radius of curvature, expressed in meters and CURVmin is expressed in diopters.

Similarly, a maximum curvature CURVmax can be defined at any point on a non spheric surface by the formula:

$$CURV_{max} = \frac{1}{R_{min}}$$

where Rmin is the local minimum radius of curvature, expressed in meters and CURVmax is expressed in diopters.

When the surface is non spherical, the local minimum radius of curvature Rmin and the local maximum radius of curvature Rmax are different.

From these expressions of the minimum and maximum curvatures CURVmin and CURVmax, the minimum and maximum spheres labeled SPHmin and SPHmax can be deduced according to the kind of surface considered.

When the surface considered is the object side surface (also referred to as the front surface), the expressions are the following:

$$SPH_{min} = (n-1) * CURV_{min} = \frac{n-1}{R_{max}} \text{ and}$$

$$SPH_{max} = (n-1) * CURV_{max} = \frac{n-1}{R_{min}}$$

where n is the index of the constituent material of the lens.

If the surface considered is an eyeball side surface (also referred to as the back surface), the expressions are the following:

$$SPH_{min} = (1-n) * CURV_{min} = \frac{1-n}{R_{max}} \text{ and}$$

$$SPH_{max} = (1-n) * CURV_{max} = \frac{1-n}{R_{min}}$$

where n is the index of the constituent material of the lens.

Based on the thin lens approximation, considering that the thickness of the lens is very small compared to the radius of curvature, one may consider that the maximum and minimum power are expressed as following:

$$P_{max} \approx SPH_{max,back} + SPH_{max,front}$$

$$P_{min} \approx SPH_{min,back} + SPH_{min,front}$$

As is well known, a mean sphere SPHmean at any point on a non spherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL = |SPH_{max} - SPH_{min}|$.

Based on the thin lens approximation, considering that the thickness of the lens is very small compared to the radius of curvature, one may consider that the mean power is expressed as following:

$$P_{mean} \approx SPH_{mean,back} + SPH_{mean,front}$$

The characteristics of any surface of the lens may be expressed by the local mean spheres and cylinders.

It can be noticed that when the surface is locally or totally spherical, the local minimum radius of curvature Rmin and the local maximum radius of curvature Rmax are the same and, accordingly, the minimum and maximum curvatures CURVmin and CURVmax are also identical so as the minimum and maximum spheres SPHmin and SPHmax.

Figure 1:
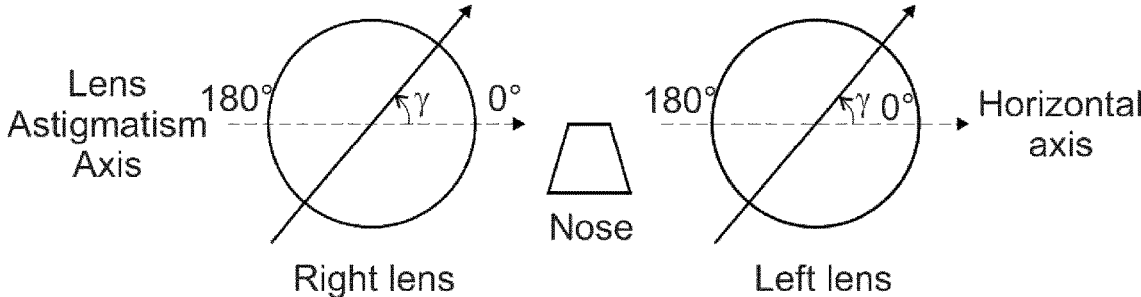
FIG. 1 illustrates the astigmatism axis $\gamma$ of an ophthalmic lens in the TABO convention.

For a non spherical surface, a local cylinder axis $\gamma_{AX}$ may further be defined. FIG. 1 illustrates the astigmatism axis $\gamma$ as defined in the TABO convention and FIG. 2 illustrates the cylinder axis $\gamma_{AX}$ in a convention defined to characterize a non spherical surface.

The cylinder axis $\gamma_{AX}$ is the angle of the orientation of the maximum curvature CURVmax with relation to a reference axis and in the chosen rotation direction. In the above defined convention, the reference axis is horizontal (the angle of this reference axis is 0°) and the rotation direction is counterclockwise for each eye, when looking at the wearer ($0°\delta\gamma_{AX}\delta180°$). An axis value for the cylinder axis $\gamma_{AX}$ of +450 therefore represents an axis oriented obliquely, which when looking at the wearer, extends from the quadrant located up on the right to the quadrant located down on the left.

Figure 2:
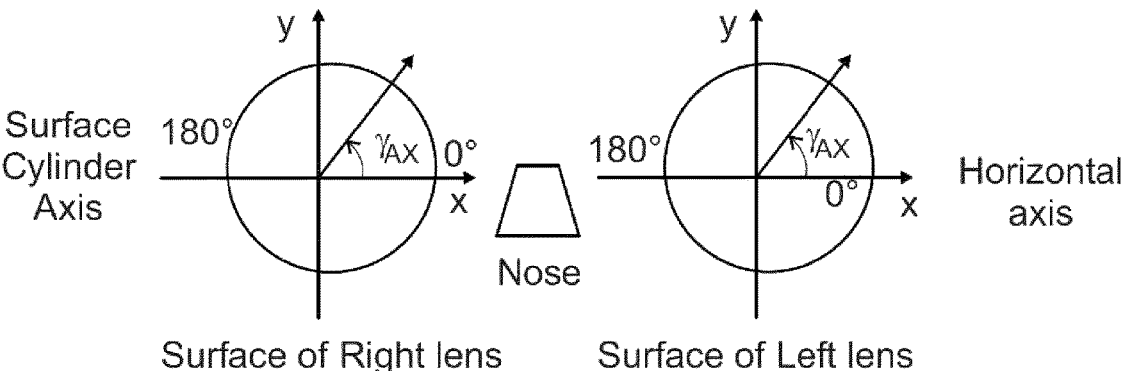
FIG. 2 illustrates the cylinder axis $\gamma AX$ in a convention used to characterize a non spherical surface.

In addition, based on the knowledge of the value of the local cylinder axis $\gamma_{AX}$, Gauss formula enables to express the local sphere SPH along any axis θ, θ being a given angle in the referential defined in FIG. 2. The axis θ is shown in FIG. 3.

$$SPH(\theta) = SPH_{max} \cos^2(\theta - \gamma_{AX}) + SPH_{min} \sin^2(\theta - \gamma_{AX})$$

As expected, when using the Gauss formula, SPH ($\gamma_{AX}$) =SPHmax and SPH ($\gamma_{AX}$+90°)=SPHmin.

The Gauss formula can also be expressed in term of curvature so that the curvature CURV along each axis forming an angle θ with the horizontal axis by:

$$CURV(\theta) = CURV_{max} \cos^2(\theta - \gamma_{AX}) + CURV_{min} \sin^2(\theta - \gamma_{AX})$$

A surface may thus be locally defined by a triplet constituted by the maximum sphere SPHmax, the minimum sphere SPHmin and the cylinder axis $\gamma_{AX}$. Alternatively, the triplet may be constituted by the mean sphere SPHmean, the cylinder CYL and the cylinder axis $\gamma_{AX}$.

Whenever a lens is characterized by reference to one of its aspherical surfaces, a referential is defined with respect to micro-markings as illustrated in FIGS. 4 and 5, for a surface bearing micro-markings and for a surface not bearing the micro-markings respectively.

The micro-markings also make it possible to define a coordinate system for both surfaces of the ophthalmic lens.

FIG. 4 illustrates a coordinate system for the surface bearing the micro-markings. The center of the surface (x=0, y=0) is the point of the surface at which the normal N to the surface intersects the center of the segment linking the two micro-markings. MG is the collinear unitary vector defined by the two micro-markings. Vector Z of the referential is equal to the unitary normal (Z=N); vector Y of the referential is equal to the vector product of Z by MG; vector X of the referential is equal to the vector product of Y by Z. {X, Y, Z} thereby form a direct orthonormal trihedral. The center of the referential is the center of the surface x=0 mm, y=0 mm. The X axis is the horizontal axis and the Y axis is the vertical axis as it shown in FIG. 2.

FIG. 5a illustrates a coordinate system for the surface opposite to the surface bearing the micro-markings. The center of this second surface (x=0, y=0) is the point at which the normal N intersecting the center of the segment linking the two micro-markings on the first surface intersects the second surface. Referential of the second surface is constructed the same way as the referential of the first surface, i.e. vector Z is equal to the unitary normal of the second surface; vector Y is equal to the vector product of Z by MG; vector X is equal to the vector product of Y by Z. As for the first surface, the X axis is the horizontal axis and the Y axis is the vertical axis as it shown in FIG. 2. The center of the referential of the surface is also x=0 mm, y=0 mm.

FIGS. 5b and 5c are diagrammatic illustrations of optical systems of eye and lens, thus showing the definitions used in the description. More precisely, FIG. 5b represents a perspective view of such a system illustrating parameters $\alpha$ and $\beta$ used to define a gaze direction. FIG. 5c is a view in the vertical plane parallel to the antero-posterior axis of the wearer's head and passing through the center of rotation of the eye in the case when the parameter R is equal to 0.

The center of rotation of the eye is labeled Q'. The axis Q'F', shown on FIG. 5c in a dot-dash line, is the horizontal axis passing through the center of rotation of the eye and extending in front of the wearer—that is the axis Q'F' corresponding to the primary gaze view. This axis cuts the front surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As example, a value of radius q' of 25.5 mm corresponds to a usual value and provides satisfying results when wearing the lenses.

A given gaze direction—represented by a solid line on FIG. 5b—corresponds to a position of the eye in rotation around Q' and to a point J of the apex sphere; the angle $\beta$ is the angle formed between the axis Q'F' and the projection of the straight line Q'J on the horizontal plane comprising the axis Q'F'; this angle appears on the scheme on FIG. 5b. The angle $\alpha$ is the angle formed between the axis Q'J and the projection of the straight line Q'J on the horizontal plane comprising the axis Q'F'; this angle appears on the scheme on FIGS. 5b and 5c. A given gaze view thus corresponds to a point J of the apex sphere or to a couple ($\alpha$, $\beta$). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle $\alpha$ of the order of 350 and to an angle $\beta$ of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance is considered for a gaze direction ($\alpha$,$\beta$). An object proximity ProxO is defined for the point M on the corresponding light ray in the object space as the inverse of the distance MJ between point M and point J of the apex sphere:

$$ProxO=1/MJ$$

This enables to calculate the object proximity within a thin lens approximation for all points of the apex sphere. For a real lens, the object proximity can be considered as the inverse of the distance between the object point and the front surface of the lens, on the corresponding light ray.

For the same gaze direction ($\alpha$,$\beta$), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

$$Pui=ProxO+ProxI$$

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle $\gamma$. The angle $\gamma$ is measured in the frame {Q', $x_m$, $y_m$, $z_m$} linked to the eye. It corresponds to the angle with which the image S or T is formed depending on the convention used with relation to the direction $z_m$ in the plane {Q', $z_m$, $y_m$}.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

FIG. 5d represents a perspective view of a configuration wherein the parameters $\alpha$ and $\beta$ are non zero. The effect of rotation of the eye can thus be illustrated by showing a fixed frame {x, y, z} and a frame {$x_m$, $y_m$, $z_m$} linked to the eye.

Frame {x, y, z} has its origin at the point Q'. The axis z is the axis Q'O and it is oriented from the lens toward the eye. The y axis is vertical and oriented upwardly. The x axis is such that the frame {x, y, z} is orthonormal and direct. The frame {$x_m$, $y_m$, $z_m$} is linked to the eye and its center is the point Q'. The $z_m$ axis corresponds to the gaze direction JQ'. Thus, for a primary gaze direction, the two frames {x, y, z} and {$x_m$, $y_m$, $z_m$} are the same.

It is known that the properties for an optical lens may be represented in several different ways and notably on a surface and optically. A surface representation is thus equivalent to an optical representation.

Indeed, both representations enable to describe the same object from two different points of view. Whenever the characteristic of the lens is optical, it refers to an ergorama-eye-lens system. For simplicity, the term 'ophthalmic lens' is used in the description but it has to be understood as the 'ergorama-eye-lens system'. The points are located with the help of abscissa or ordinate in a frame as defined above with respect to FIGS. 2, 4 and 5a.

The same characteristic can be calculated for gaze directions. Gaze directions are usually given by their degree of lowering and azimuth in a frame whose origin is the center of rotation of the eye and whose reference direction is the primary gaze direction, which corresponds to the situation where a wearer is looking straight ahead. When the lens is mounted in front of the eye, a ray trace in the primary gaze direction will pass through the eye rotation center Q' and hence the eye pupil center and will intersect the lens front surface at its fitting cross. In the chosen frame, the fitting cross corresponds thus to a lowering angle α of 0° and an azimuth angle β of 0°.

The above description made with reference to FIGS. 5b-5d was given for central vision. In peripheral vision, as the gaze direction is fixed, the center of the pupil is considered instead of the center of rotation of the eye and peripheral ray directions are considered instead of gaze directions. When peripheral vision is considered, angle α and angle β correspond to ray directions instead of gaze directions.

In the reminder of the description, terms like «up», «bottom», «horizontal», «vertical», «above», «below», «front», «rear» or other words indicating relative position may be used. These terms are to be understood in the wearing conditions of the lens.

Notably, the "upper" part of the lens corresponds to a negative lowering angle α<0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y_value at the fitting cross and the "lower" part of the surface of a lens—or of a semi-finished lens blank—corresponds to a negative value along the y axis in the frame as defined above with respect to FIGS. 2, 5a and 5b, and preferably to a value along the y axis inferior to the y value at the fitting cross.

Regarding the optical parameter considered as the acuity, a "relative acuity", referred as AC %_P, is defined as the result of a function of the mean refractive power error, PE_P, and of the resulting astigmatism, ASR, according to an acuity model, at a given point of the object space (α, β, ProxO).

The mean refractive power error, referred as PE_P, is defined as the mean refractive power difference between the actual optical power brought by the lens and the proximity, at a given point of the object space (α,β,ProxO), according to the following equation:

$$PE\_P(\alpha,\beta,ProxO)=Pui(\alpha,\beta,ProxO)-(Pui(FV)-ProxFV_p)-ProxO$$

where Pui(FV) is the mean refractive power of the prescription of the wearer according to the far-vision gaze direction, for an object located at a distance corresponding to $ProxFV_p$. The prescription for far vision distance is determined at a given vision distance corresponding to a given proximity $ProxFV_p$, in most cases $ProxFV_p=0$.

An example of an embodiment of calculation of relative acuity is provided here below.

An "acuity loss", referred as ACU_P, is defined as a function of the relative acuity at a given point of the object space (α, β, ProxO), according to the following equation:

$$ACU_{P(\alpha,\beta,ProxO)} = -\log\ \log\left(\frac{AC\ \%P(\alpha,\beta,ProxO)}{100}\right)$$

where "log" is the logarithm in base 10.

In the sense of the invention, optical distortion is an aberration affecting the geometry of the visual scene. It may be aberration produced by ophthalmic lens (but not including the modification of sharpness), either unifocal or progressive lens, or part of it. For example, we can use specific combination of some terms of the decomposition of it using a classical polynomial decomposition like Zernike, monome, Tchebitchev polynomial for example. It may be more complex deformation (linear, non-linear, local or global). It may be dynamic distortion referring to aberration changing in time.

The target value is a given value corresponding to a designed numeral value relative to an optical criterion, so as to obtain the optical lens corresponding to the wearer needs.

For example, the target value for the optical criteria corresponding to the optical power and the astigmatism is defined by the prescription.

Regarding the distortion, it is preferred to have the lowest target value as possible.

As illustrated in FIG. 6, the method of the disclosure comprises at least:
an initial optical lens providing step S1,
an intermediate optical lens determining step S2, and
an optical lens determining step S3.

During the initial optical lens providing step S1, the prescription of the wearer is provided for a given wearing condition in a specific gaze direction and for a specific object distance.

The specific gaze direction may correspond to the primary gaze direction. The primary gaze direction corresponds to the situation where the wearer is looking straight ahead.

In the case of single vision lenses, the single vision lens is designed to be used for a specific object distance. The object distance is for near vision about 40 cm, for the intermediate vision about 1 m and for the far vision about 4 m. For a given single vision lens, a predetermined gaze angle is predefined as the optical lens is designed for a specific use.

The gaze direction being lower in near vision compared to far and intermediate.

The initial optical lens providing step S1 enables the provision of an initial optical lens adapted in a specific gazing direction and object distance to the prescription of the wearer in a given wearing condition.

The initial optical lens may be provided based on a database or may be calculated. The prescription parameters and the wearing condition might be parameters depending on the wearer or parameters corresponding to a standard wearer.

The provided optical lens can be a spherical lens, toric lens or an aspherical lens. The provided optical lens is named afterwards initial lens. The initial lens fulfils the prescription parameter.

The determining method further comprises an intermediate optical lens determining step S2. During the intermediate optical lens S2, an intermediate optical lens is determined by optimizing the initial optical lens so that the difference between the values of the optical criteria of said intermediate optical lens and the target values around the specific gaze direction are smaller than or equal to the threshold values.

The threshold value is standard or customized depending on the wearer. A standard threshold value may be a predefined value, for example based on the lens prescription.

The threshold value may be based on a specific sensitivity parameter of the wearer for the optical criteria. Advantageously, this enables the design of an optimized intermediate optical lens which takes into account the tolerance of the wearer according to a gap between the target optical criteria value and the optical criteria value in a given direction. The specific sensitivity parameters can be based on the age, the wearer prescription, or the wearer measured sensitivity to the optical criteria.

The intermediate optical lens corresponds to an optimization of the initial optical lens where the difference between the values of the optical criteria of the initial optical lens and the target values are smaller or equal to the threshold values around the specific gaze direction.

So as to optimize the initial optical lens, a layer may be applied onto a surface of the initial optical lens.

In an embodiment, the layer is applied on the rear surface of the initial lens, corresponding to the surface facing the eye of the wearer once the lens has been determined, manufactured and worn by a wearer.

The optimization of the initial optical lens can be based on a layer which may be defined by a weighting cost function or a penalized function.

The layer to apply can be a Zernike layer.

In such manner, as an example, the intermediate optical lens can be determined by adding a Zernike layer to at least one surface of the initial optical lens, preferentially the rear surface as defined above.

The front surface of the intermediate lens can be a spherical surface, and the rear surface to which the Zernike layer is applied is a tridimensional surface.

In the case where a Zernike layer is used, the order of the Zernike polynomials does not require to be high for single vision lens.

A Zernike layer has an order greater than or equal to 4, preferably greater to 6 and even more preferably greater to 10.

The optimization function used when determining the intermediate optical lens can be based on a weighted cost function of the gaze direction with a decreasing weight for gaze directions based on the distance to the specific gaze direction.

An example of weight cost function is given hereafter. In such an example, the optical criteria are the optical power and the unwanted astigmatism, and the gaze direction is defined as the primary gaze direction.

A(X,δpow,δast) defines the set of all gaze directions such that the power error and unwanted astigmatism are below given thresholds δpow, δast.

In such manner A is defined with the following formula:

$$A(X, \delta_{Pow}, \delta_{Ast}) = \{(\alpha, \beta) \in \mathbb{R}^2,$$

$$|PowerError(X)| \le \delta_{Pow} \text{ and } |UnwantedAstigmatism(X)| \le \delta_{Ast}\}$$

X is the vector of lens variables for the optimization. For example, the components of the vector X may be parameters that define a surface such as Zernike coefficients.

More generally, it could be any parameters that define an optical lens:
  Surface parameters (Zernike coefficients, the radius of a sphere, aspherization coefficients, altitudes of control points, etc. . . . ),
  Kinematics parameters (translations, rotations from one surface to another),
  Refractive index parameters such as coefficients of an index gradient.

δpow defines the threshold for optical power and δast defines the threshold for unwanted astigmatism.

A set of all gaze directions of interest is defined by the letter K. In such manner:

$$(\alpha, \beta) \in K$$

The weighting cost function to determine the layer to apply to one of the surfaces of the initial optical lens is a least squares method defined as follows:

$$f(X) = \sum_{(\alpha,\beta) \in K} W(\alpha, \beta) \qquad (1)$$

$$[u \cdot PowerError(X, \alpha, \beta)^2 + v \cdot UnwantedAstigmatism(X, \alpha, \beta)^2]$$

The parameters u and v define weights that allow to favor either power error or unwanted astigmatism, depending on the wearer's sensitivity. The above example concerns optical power and unwanted astigmatism, but other optical criteria could have been considered as well.

W is a weighting function of the gaze direction that allows a preferred distribution of the aberrations on the lens. The aberrations can be chosen as equal to zero in the gaze direction (0,0) and increase monotonically away from the center.

For example W(α, β) is defined as follows:

$$W(\alpha, \beta) = \left\{ e^{-\frac{\sqrt{\alpha^2 + \beta^2}}{k}}, k > 0 \right.$$

The choice of the weighting function parameter k will depend on how fast the lens designer allow the aberrations to increase as one moves away from the center (0,0) of the lens. Small k values tend to favor the center (0,0) of the lens, and yield very little aberrations at the center, the tradeoff being that they increase rather quickly away from it. Intermediate k values give a smoother error progression, and help to achieve maximization of a disc radius for which all gaze directions are below given thresholds in terms of power error and unwanted astigmatism. Large k values are equivalent to using no weights at all as W~=1 for all gaze directions.

Advantageously, such optimization function including weights favors the zone of the lens to optimize, in particular the zone around the specific gaze direction being the zone of the lens the most frequently used by the wearer in the case of single vision lens.

According to an embodiment of the present disclosure a penalization function can be added to the optimization function used when determining the intermediate optical lens so as to ensure that in a defined zone around the specific gaze direction the difference between the value of the optical criteria of said intermediate optical lens and the target value is smaller than or equal to the threshold value.

The example is similar to the above-mentioned example where the initial optical lens is a single vision lens and where the optical criteria are the optical power and the unwanted astigmatism. In this example, the specific gaze direction is also the primary gaze direction.

The penalization function is a penalized function of the weighting cost function (1). The penalization ensures that in a defined area, the power error and the unwanted astigmatism are less than a threshold value. The threshold value can be any value in the range of 0.03D to 0.25D, for example 0.06D.

The penalized function is defined as follows:

$$f(X) = \sum_{(\alpha,\beta)\in K} \left[ u \cdot PowerError(X, \alpha, \beta)^2 + v \cdot \right. \tag{2}$$

$$\left. UnwantedAstigmatism(X, \alpha, \beta)^2 + u' \cdot p_{pow}(X, \alpha, \beta)^2 + v' \cdot p_{Ast}(X, \alpha, \beta)^2 \right]$$

The parameters u, v, u' and v' corresponds to weights that allow to favor either the power error or the unwanted astigmatism and $p_{pow}$ and $p_{ast}$ corresponds to penalize functions.

$P_{pow}$ is defined as follows:

$$p_{pow}(X, \alpha, \beta) = \{k \cdot |PowerErrror(X, \alpha, \beta) -$$

$$\delta_{pow}| \; 0 \; if\{|PowerErrror(X, \alpha, \beta)| \geq \delta_{pow} \; otherwise$$

$P_{ast}$ is defined as follows:

$$p_{Ast}(X, \alpha, \beta) = \{k' \cdot |UnwantedAstigmatism(X, \alpha, \beta) -$$

$$\delta_{Ast}| \; 0 \; if\{|PowerErrror(X, \alpha, \beta)| \geq \delta_{Ast} \; otherwise$$

The penalization can be quadratic penalization. In such manner, the power penalized function would be as follows:

$$p_{pow}(X, \alpha, \beta) = \{k \cdot (PowerErrror(X, \alpha, \beta) -$$

$$\delta_{pow})^2 0 \; if\{|PowerErrror(X, \alpha, \beta)| \geq \delta_{pow} \; otherwise$$

The quadratic penalized function of the unwanted astigmatism, would be as follows:

$$p_{Ast}(X, \alpha, \beta) = \{k' \cdot (UnwantedAstigmatism(X, \alpha, \beta) -$$

$$\delta_{Ast})^2 \; 0 \; if\{|PowerErrror(X, \alpha, \beta)| \geq \delta_{Ast} \; otherwise$$

k and k' are parameters that will be adjusted depending on the wearer sensitivity.

Advantageously, in a similar manner to the weights optimization function, the penalized function enables an optimization in the zone around the specific gaze direction. Said optimization of the intermediate lens implies that the optimization of the lens in a particular zone, being the zone around the given specific gazing direction, is according to the optical criteria and ensures that the difference of the optical criteria values of the optimized lens and a target values are equal or smaller to the threshold values. In such manner said penalization function enables an optimization according to the given optical criteria, taking into account the specific sensitivity parameters of the wearer regarding the optical criteria, in a particular zone of the lens being the most commonly used zone of the lens.

At the end of the intermediate optical lens determining step S2, the optical lens comprises a sufficiently large area around the specific gaze direction centered on the specific gaze direction where the differences of the optical criteria values of the optimized initial lens and the target values are equal or smaller to the threshold values.

The determining method comprises an optical lens determining step S3. During the optical lens determining step S3, the optical lens is determined by optimizing the intermediate optical lens. The optimization aims to obtain the largest zone of gaze directions around the specific gaze direction for which the differences between the values of the optical criteria and the target values are smaller than or equal to the threshold values. Said optimization can be obtained by optimizing at least one surface of the intermediate optical lens.

The method aims at providing the largest zone of gaze direction that corresponds to the wearer prescription and the wearer wearing conditions, where the difference between the values of the optical criteria and the target values are smaller than or equal to the threshold values around the specific gaze direction.

The zone to be enlarged corresponds to the zone around the specific gaze direction, which may be the primary gaze direction, where the differences between the values of the optical criteria and the target values are smaller than or equal to the threshold values. This zone can also be defined as the set of gaze directions around the specific gaze direction, where the difference between the values of the optical criteria and the target values are smaller than or equal to the threshold values.

Advantageously, the optimization method enables to enlarge the zone of gaze direction adapted to the wearer prescription and the wearer wearing conditions for the given optical parameters, taking into account the sensitivity of the wearer relative to the optical parameters.

The optical lens determining step S3, corresponding to an optimization of the intermediate optical lens can be obtained by applying a second layer onto a surface of the intermediate optical lens.

The second layer can be applied onto the first layer applied in the intermediate optical lens determining step S2.

The second layer can be a Zernike layer.

In an embodiment, the first and the second layer can be both Zernike layers. In the case where the first and second layers are Zernike layers, there is no order relationship implied between the first and the second Zernike layers. The first and the second layers of Zernike can be of the same order.

Preferably, when the second layer is layer, of the type Zernike, the second layer to be applied has a low order. In a preferred embodiment, the order can be smaller or equal to 10, preferentially smaller or equal to 7 and even more preferentially smaller or equal to 5.

Derivative free optimization can be enabled by the use of a Zernike layer of low order. Derivative free optimization tends to be complicated in high dimension.

In an embodiment, the derivative free optimization corresponds to the Nelder-Mead algorithm. Such algorithm is convenient for its implementation.

In another embodiment, methods such as CMA-ES could also be used. CMAE-ES is a derivative-free, evolutionary algorithm to minimize non-linear, non-convex functions. It is well suited for merit functions which are non-differentiable or whose derivatives are difficult and/or computationally costly to obtain.

In an embodiment, the frame and the optical lens being fixed on said lens may have an elliptical shape. An ellipse E is defined by the parameters (r, r*a). r defines the semi-major axis and a*r defines the semi minor axis. The ellipse is centered in (0, 0) according to the (α, β) referential. Da(r) corresponds to the set of all the points included inside the ellipse E. Da(r) is defined as follows $$D_a(r) = \left\{ (\alpha, \beta) \in \mathbb{R}^2, \ \frac{\alpha^2}{r^2} + \frac{\beta^2}{a^2 r^2} \le 1 \right\}$$

Da(r*) is the largest Da(r) included in the set of gaze directions that respect the criteria thresholds. In said embodiment, the third optimization step S3 aims to enlarge the zone defined by Da(r*).

$$r^*(X, \delta_{Pow}, \delta_{Asr}) = sup\{r > 0, D_a(r) \subset A(X, \delta_{Pow}, \delta_{Asr})\}$$

r* according to the parameters X, δpow and δast, is defined by the maximal radius for Da(r) where for a given point of said set, the difference between the values of the optical criteria and the target values are smaller than or equal to the threshold values. The determination of such maximal radius r* is determined in function of the variable r, and the parameters x, δpow and δast are predefined parameters.

The second optimization enables to directly maximize r*.

The aim is to find at least one lens variable, preferably a set of lens variables that maximize r*, such that:

$$\overline{X}(\delta_{Pow}, \delta_{Ast}) = argmax_{X \in \mathbb{R}^p} r^*(X, \delta_{Pow}, \delta_{Ast})$$

Said optical lens determining step S3 can be made using derivative free optimization, directly maximizing r*.

In the above example the lens has an elliptical shape, said lens can also have a circular shape using the same maximization radius formula to determine the maximal radius of the circular bound of the zone to be optimized.

In another embodiment, the shape of the frame and the optical lens might be rectangular. In such case, the optimization of the zone to enlarge is based on homothetic transformation. Advantageously, the zone to optimize on a lens is dependent on the final shape of the optical lens to be mounted. The optimization should not be in a zone which will be unused later on. Therefore, the optimization should be done in a manner that the optimized zone is present in the remaining optical lens to be fitted on the frame. In such manner the zone of gaze directions has a shape dependent on the spectacle frame. Preferably, the optimized zone of the lens is controlled according to the shape of the frame, more particularly the openings of the frame designed to receive the optimized lenses, and the main gazing direction.

The method comprises two distinct optimization steps.

A first optical lens, namely the intermediate optical lens, is determined according to a first optimization. The first optimization comprises defining a portion of the intermediate lens wherein the difference between the value of the at least given optical criterion of said intermediate optical lens and the target value of gaze directions around the specific gaze direction is smaller than or equal to a threshold value.

The method comprises determining a second optical lens, distinct from the intermediate optical lens, based on a second optimization, namely the optimization of the intermediate lens. The second optimization aiming to enlarge the zone of gaze directions around the specific gaze direction for which the difference between the value of the at least given optical criterion and the target value around the specific gaze direction is smaller than or equal to the threshold value of the determined intermediate optical lens.

The method according to the invention may comprise a manufacturing step S4, so as to manufacture the optical lens optimized in step S3.

FIG. 7 to 10 corresponds to optical power and unwanted astigmatism diagrams of a Tscherning spherical lens and an optimized optical lens.

Figure 7:
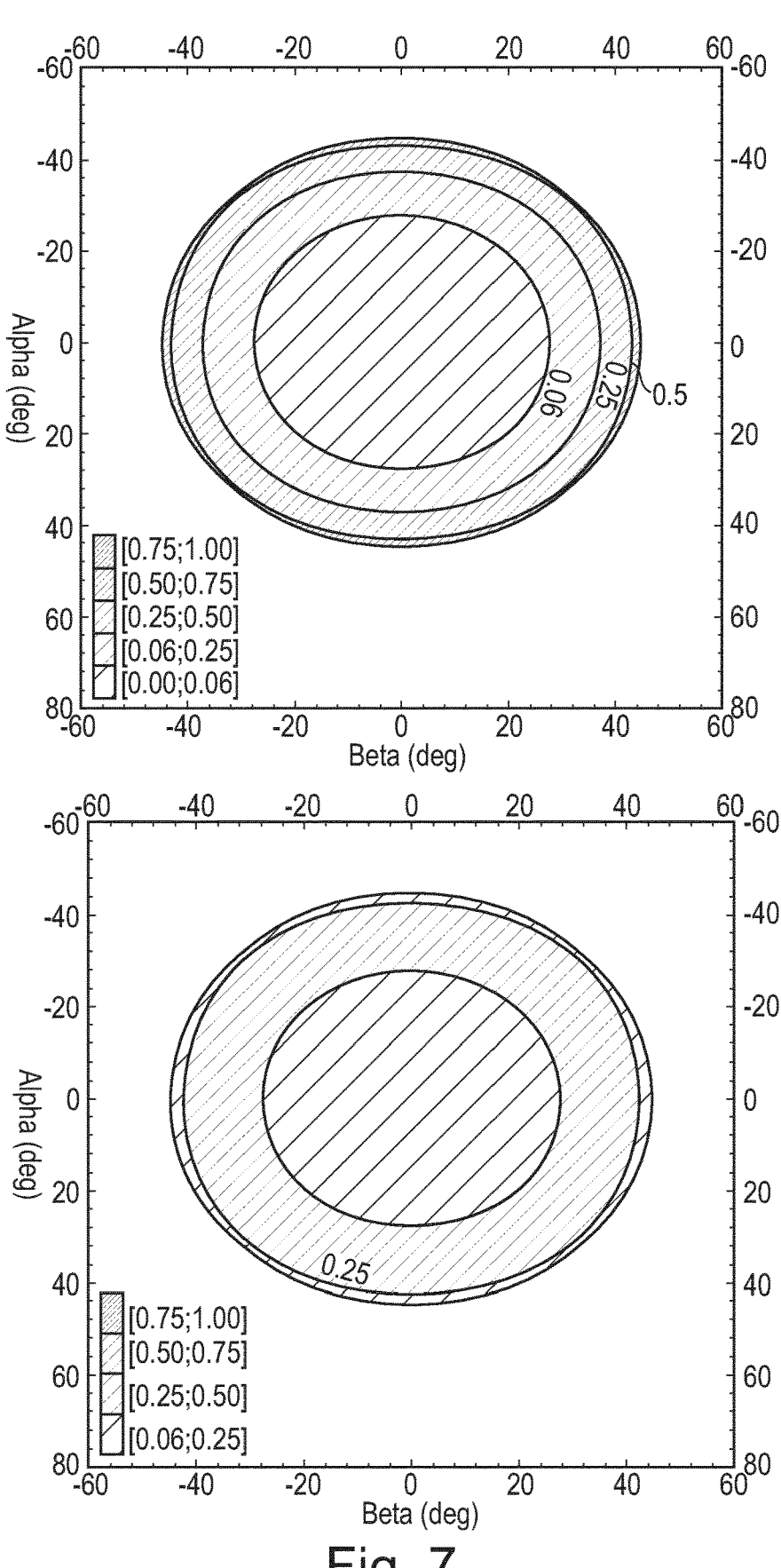
Figure 8:
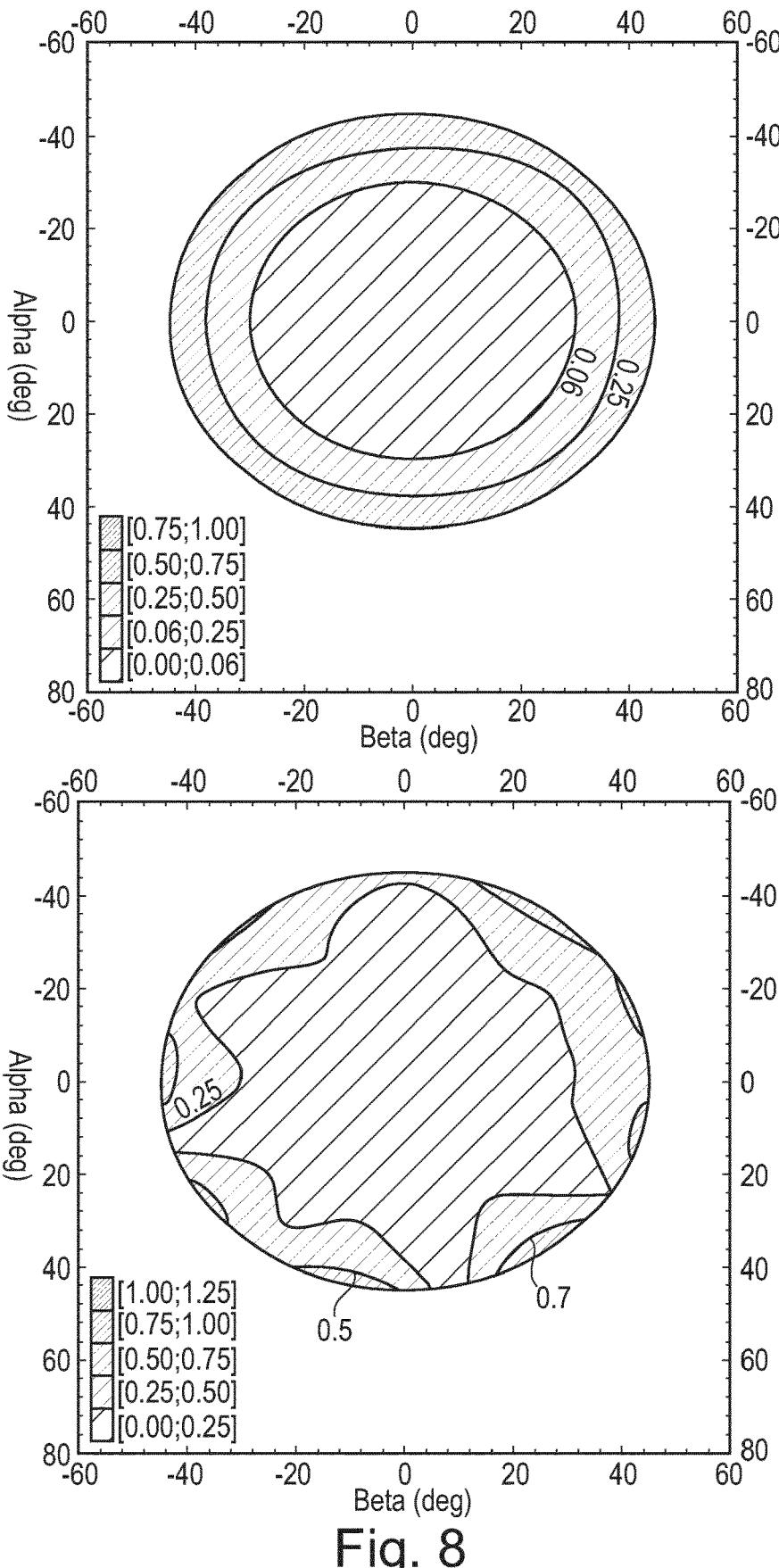

The parameters of the spherical lens are:
Prescription
    Sphere=−8D,
    Cylinder=0D,
    and a front surface radius of 303 mm FIG. 7 shows an optical power diagram and an unwanted astigmatism diagram of a Tscherning spherical lens, and FIG. 8 shows an optical power diagram and an unwanted astigmatism diagram of an optimized optical lens, where δpow=0.06D and δast=0.25D. The Tscherning spherical lens has both a front and back spherical surface. The curvature of the front surface and thus back surface was varied so as to obtain the maximum r* for the given optical criteria thresholds while preserving the prescription at the reference point. The obtained Tscherning lens is not an appropriate as a product because of its high base and thickness.

In the embodiment shown in FIGS. 7 and 8, r* of the Tscherning lens as a value of 27.6°. The optimized intermediate lens r* has a value of 23.4° with a quadratic penalization optimization. And the optimized optical lens r* has a value of 29.8°. If an initial spherical lens with a front surface radius of 303 mm had been used, r* would only be 14.9°.

Figure 9:
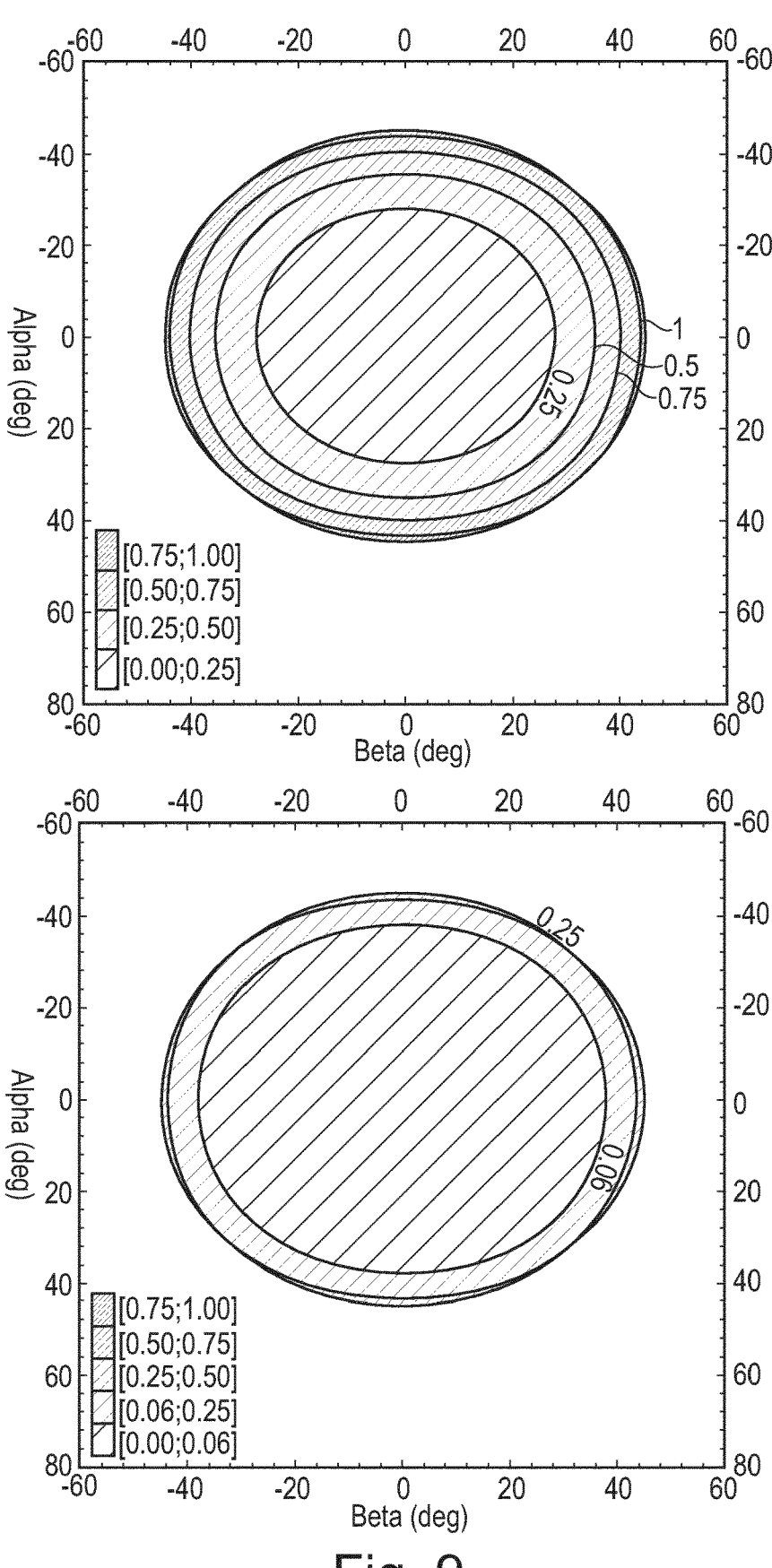
Figure 10:
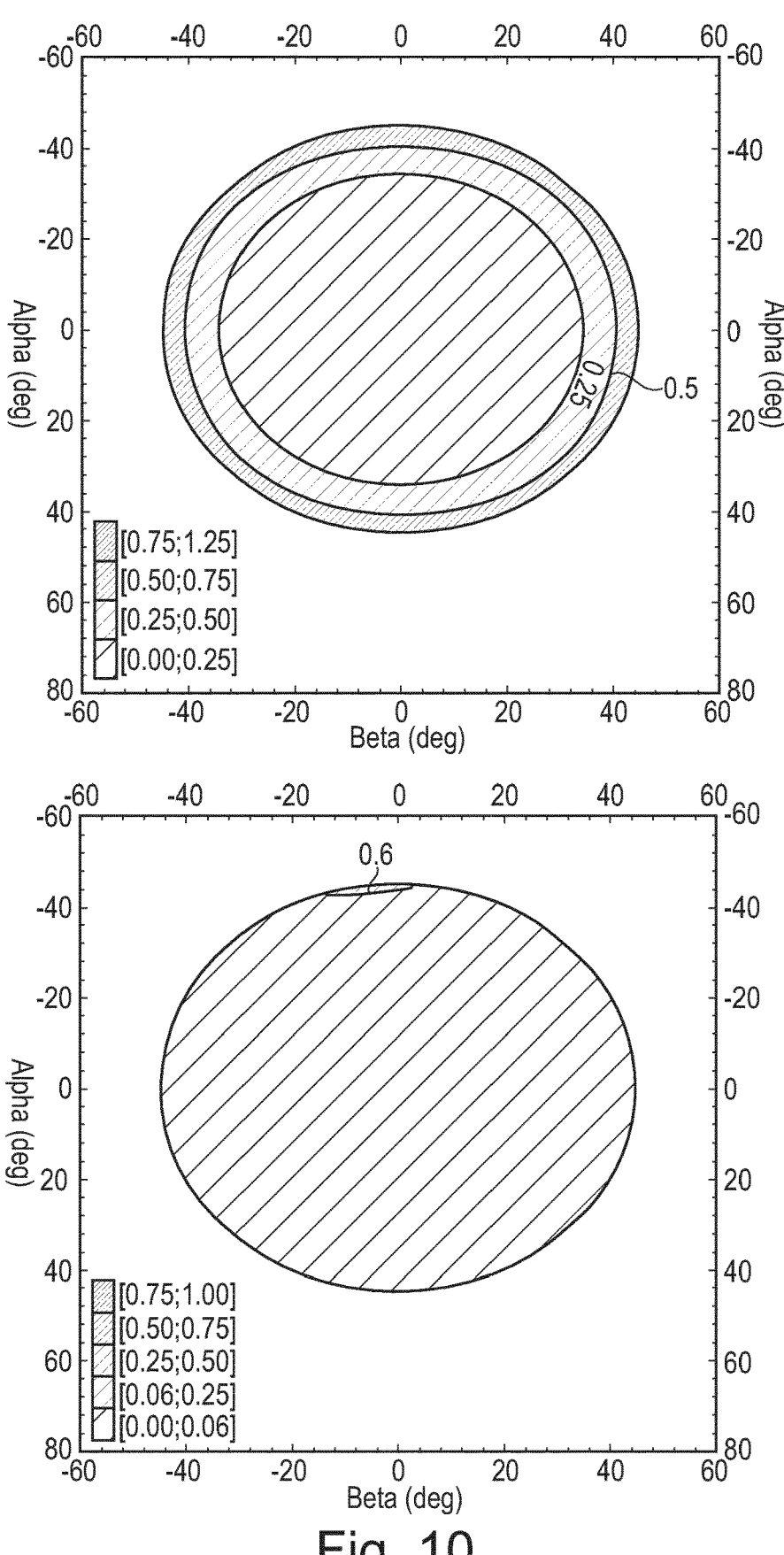

FIG. 9 shows an optical power diagram and an unwanted astigmatism diagram of a spherical lens, and FIG. 10 shows an optical power diagram and an unwanted astigmatism diagram of an optimized optical lens, where δpow=0.25D and δast=0.06D.

In the embodiment shown in FIGS. 9 and 10, r* of the Tscherning lens has a value of 27.8° The intermediate optimized lens r* has a value of 26.5° with a weighting cost function optimization. And the optimized optical lens r* has a value of 34.2°. If an initial spherical lens with a front surface radius of 303 mm had been used, r* would only be 9.3°.

FIG. 11 to 14 correspond to optical power and unwanted astigmatism diagrams of a single vision spherical lens and an optimized optical lens.

The parameters of the spherical lens are:

Prescription

Sphere=+7D

Cylinder=0D and a front surface radius of 66 mm.

Figure 11:
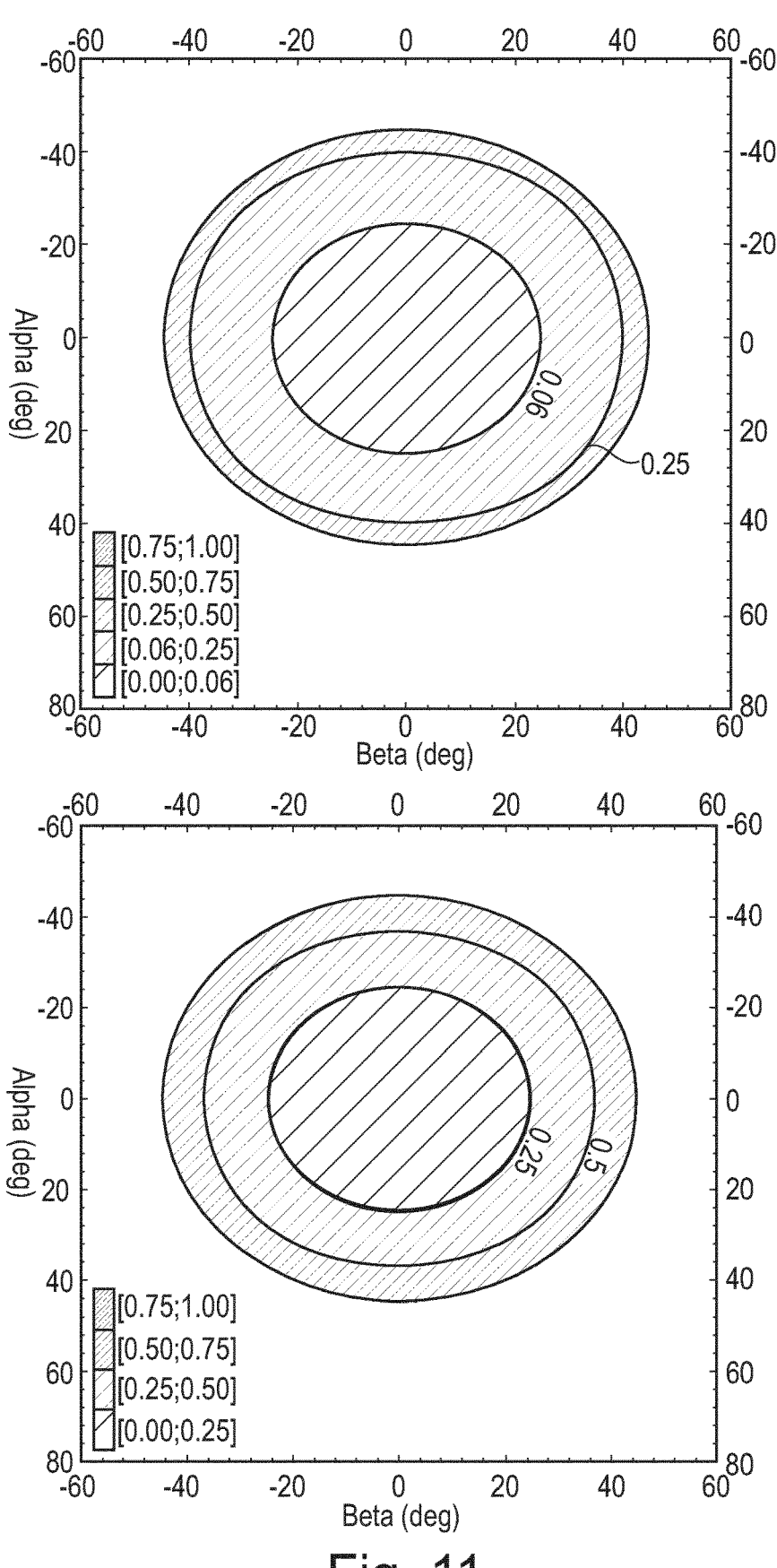
Figure 12:
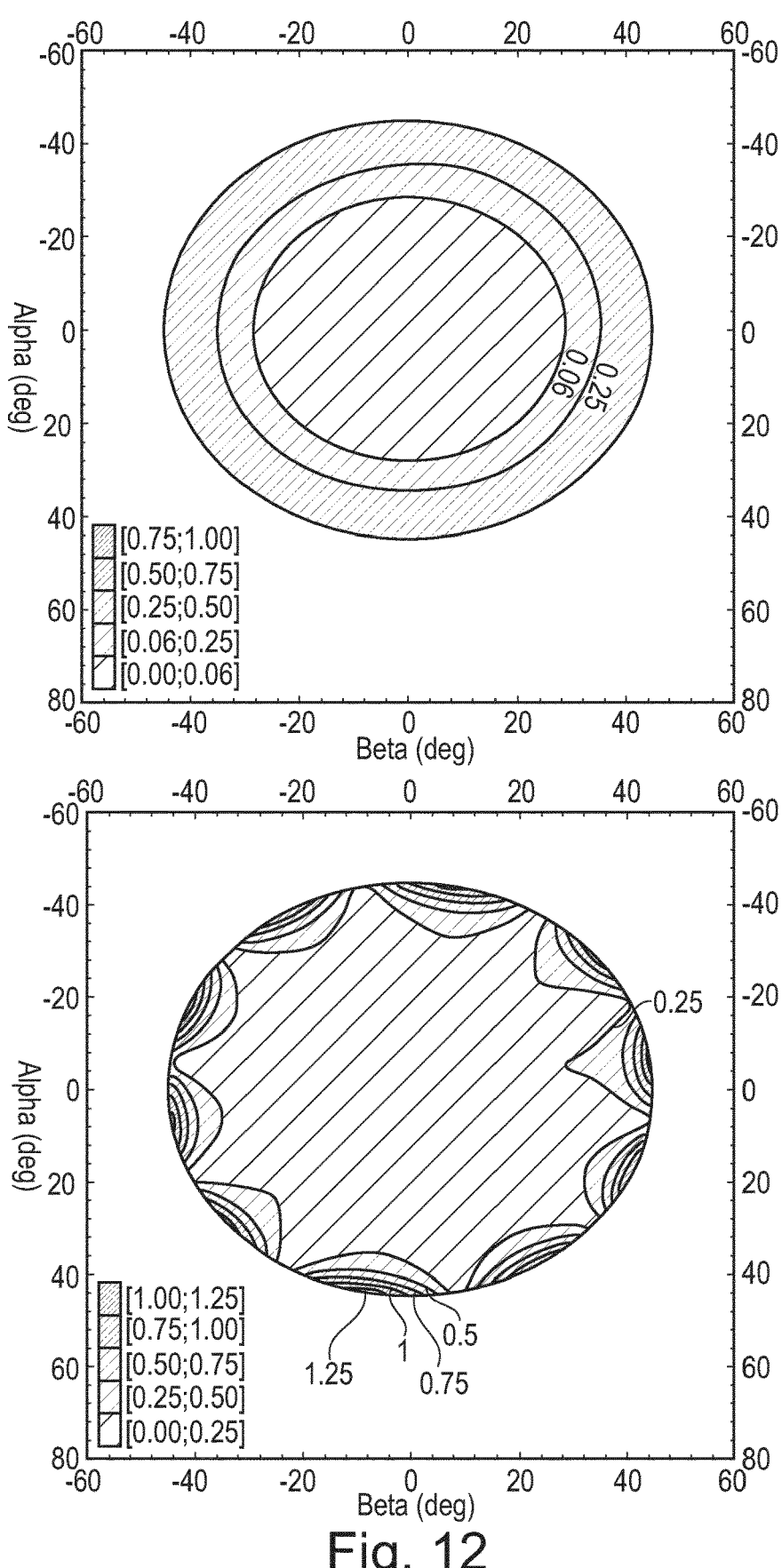

FIG. 11 shows an optical power diagram and an unwanted astigmatism diagram of a spherical lens, and FIG. 12 shows an optical power diagram and an unwanted astigmatism diagram of an optimized optical lens, where δpow=0.06D and δast=0.25D.

In the embodiment shown in FIGS. 11 and 12, r* of the Tscherning lens as a value of 24.6°. The optimized intermediate lens r* has a value of 22.0° with a weighting cost function optimization. And the optimized optical lens r* has a value of 28.3°. If an initial spherical lens with a front surface radius of 66 mm had been used, r* would only be 10.6°.

Figure 13:
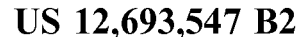
Figure 14:
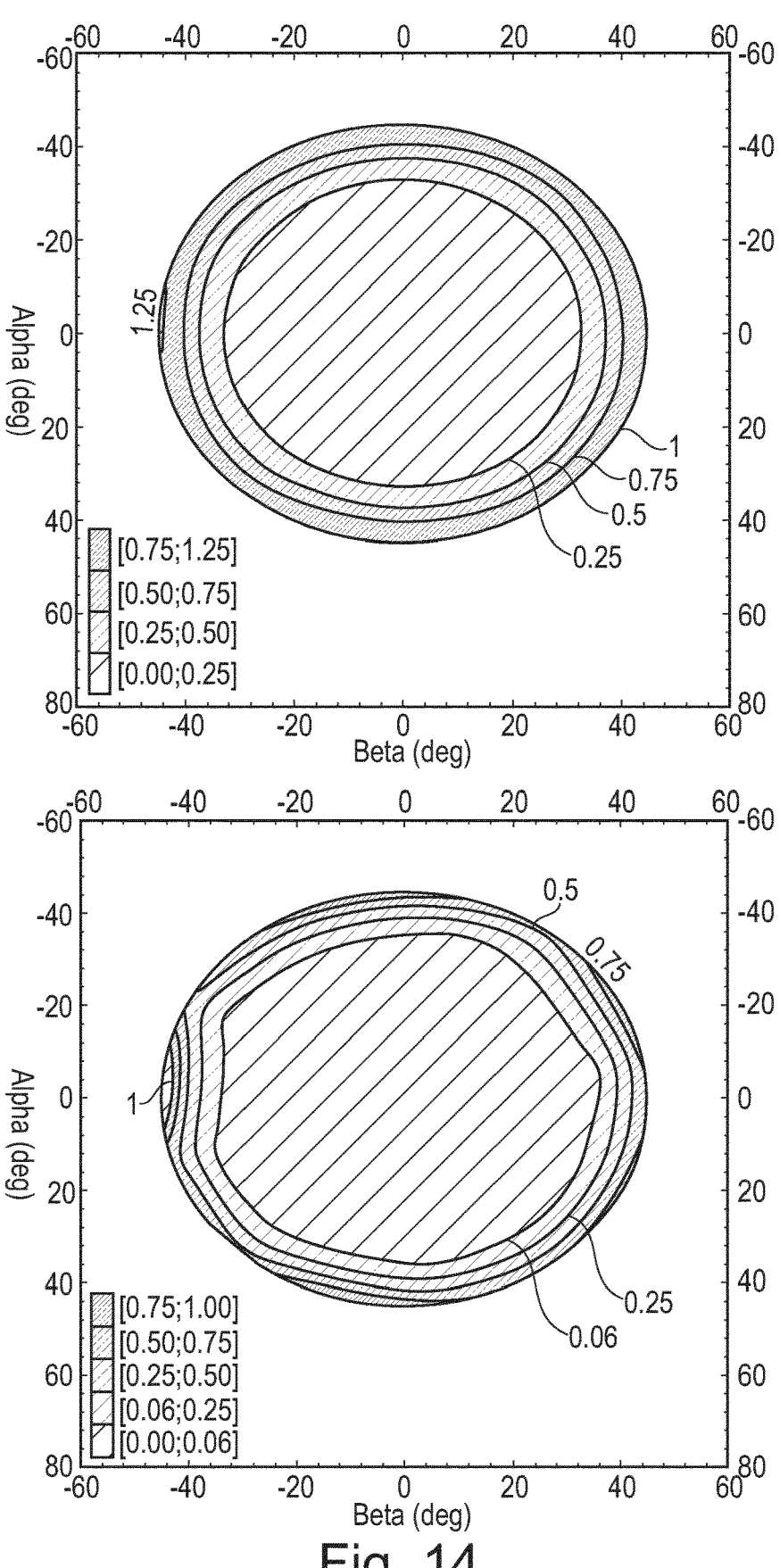

FIG. 13 shows an optical power diagram and an unwanted astigmatism diagram of a spherical lens, and FIG. 14 shows an optical power diagram and an unwanted astigmatism diagram of an optimized optical lens, where δpow=0.25D and δast=0.06D.

In the embodiment shown in FIGS. 13 and 14, r* of the Tscherning lens as a value of 23.9°. The intermediate optimized lens r* has a value of 20.4° with a weighting cost function optimization. And the optimized optical lens r* has a value of 32.8°. If an initial spherical lens with a front surface radius of 66 mm had been used, r* would only be 10.6°

Figure 15:
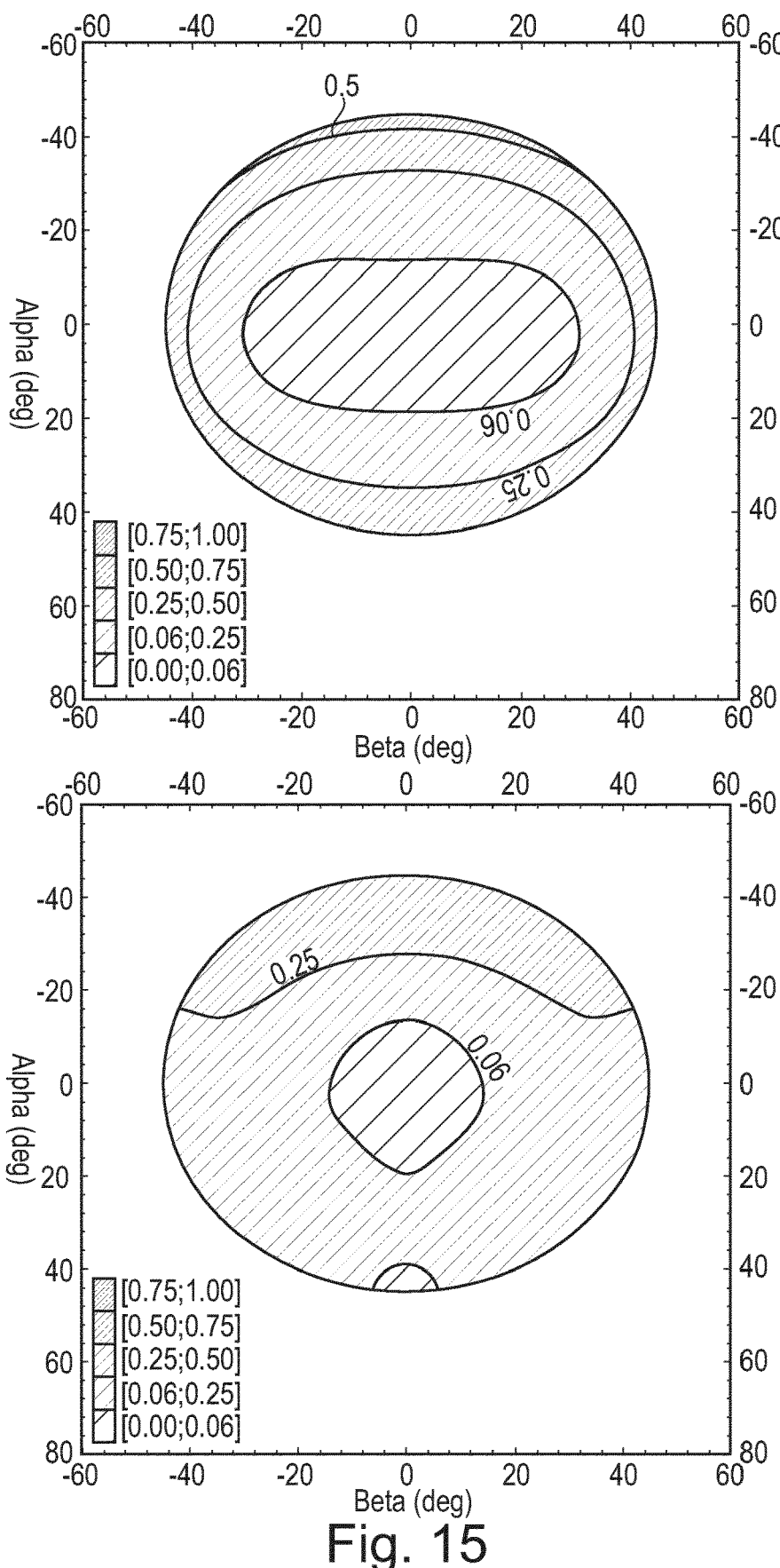
Figure 16:
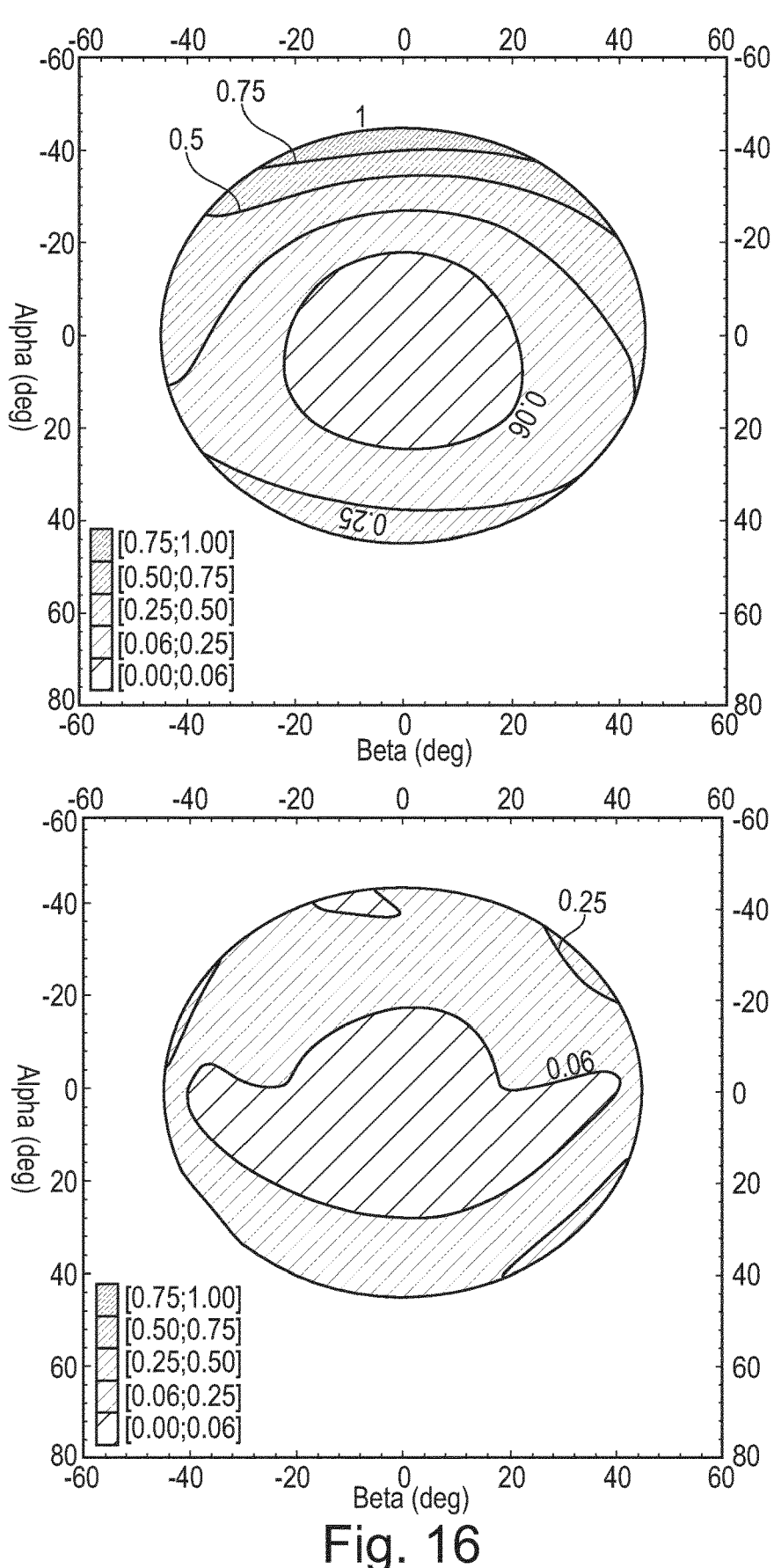

FIGS. 15 and 16 corresponds to optical power and unwanted astigmatism diagrams of a single vision Tscherning based lens and an optimized optical lens.

The prescription is Sph=−4D/Cyl=−2 D/Axis=0°. The lens pantoscopic angle is equal to −8°. The front surface radius is 193 mm FIG. 15 shows an optical power diagram and an unwanted astigmatism diagram of a Tscherning based lens, and FIG. 16 shows an optical power diagram and an unwanted astigmatism diagram of an optimized optical lens, where δpow=0.06D and δast=0.06D. The Tscherning based lens has the same front surface as the optimized optical lens. The Tscherning based lens has a complex back surface that was optimized so that to match the optical performances of a spherical Tscherning lens.

In the embodiment shown in FIGS. 15 and 16, r* of the Tscherning based lens as a value of 13.1°. The optimized intermediate lens r* has a value of 11.8° with a weighting cost function optimization. And the optimized optical lens r* has a value of 17.8°. If an initial sphero-toric lens with a front surface radius of 193 mm had been used, r* would only be 3.1°

Figure 17:
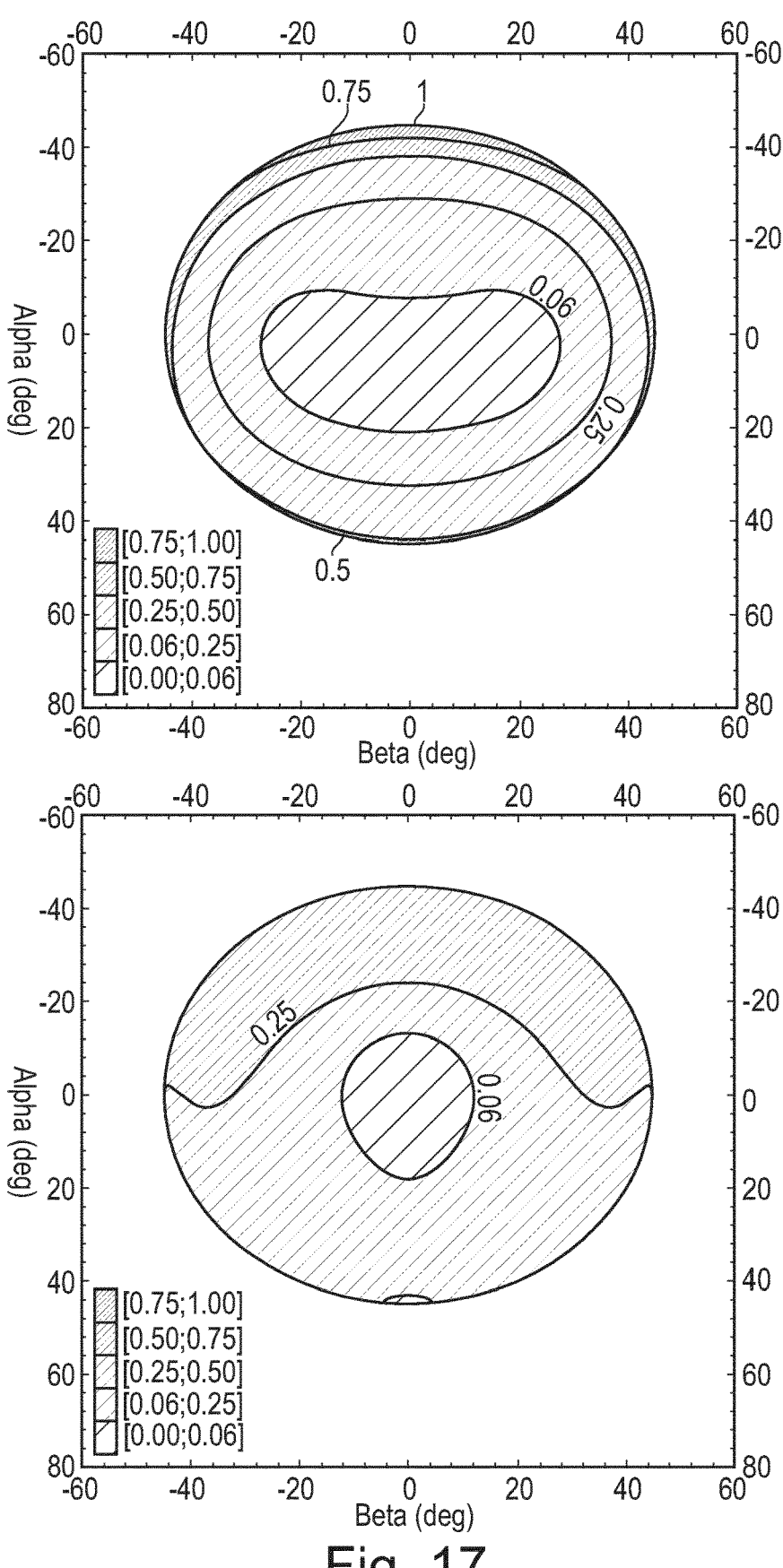
Figure 18:
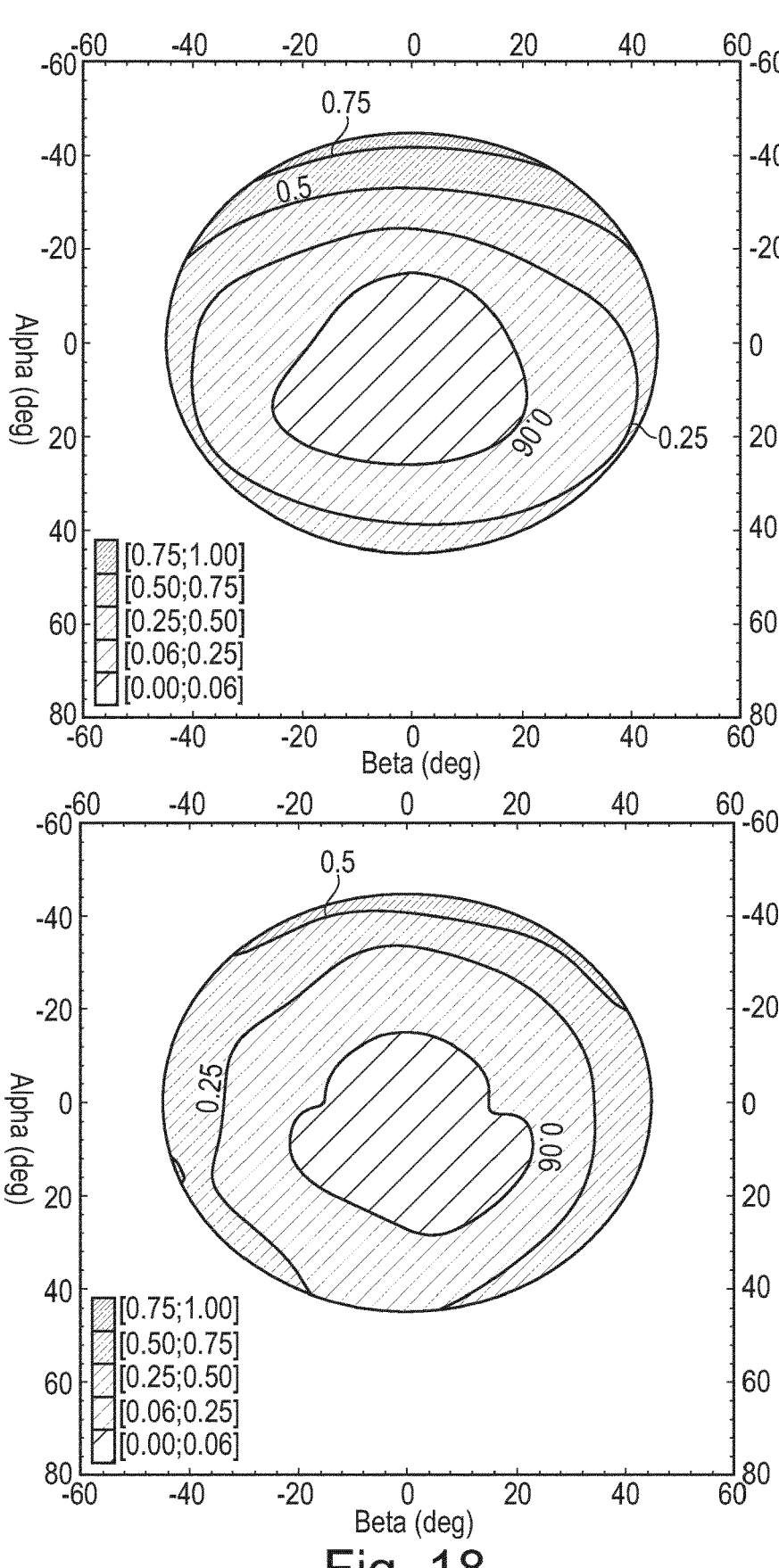

FIGS. 17 and 18 corresponds to optical power and unwanted astigmatism diagrams of a single vision Tscherning based lens and an optimized optical lens.

The prescription is Sph=−6D; Cyl=−2D; and Axis=0°. The lens front surface radius is 303 mm.

FIG. 17 shows an optical power diagram and an unwanted astigmatism diagram of a Tscherning based lens, and FIG. 18 shows an optical power diagram and an unwanted astigmatism diagram of an optimized optical lens, where δpow=0.06D and δast=0.06D.

In the embodiment shown in FIGS. 17 and 18, r* of the Tscherning bases toric lens as a value of 9°. The optimized intermediate lens r* has a value of 10.6° with a weighting cost function optimization. And the optimized optical lens r* has a value of 14.8°. If an initial sphero-toric lens with a front surface radius of 303 mm had been used, r* would only be 2.5°.

Figure 19:
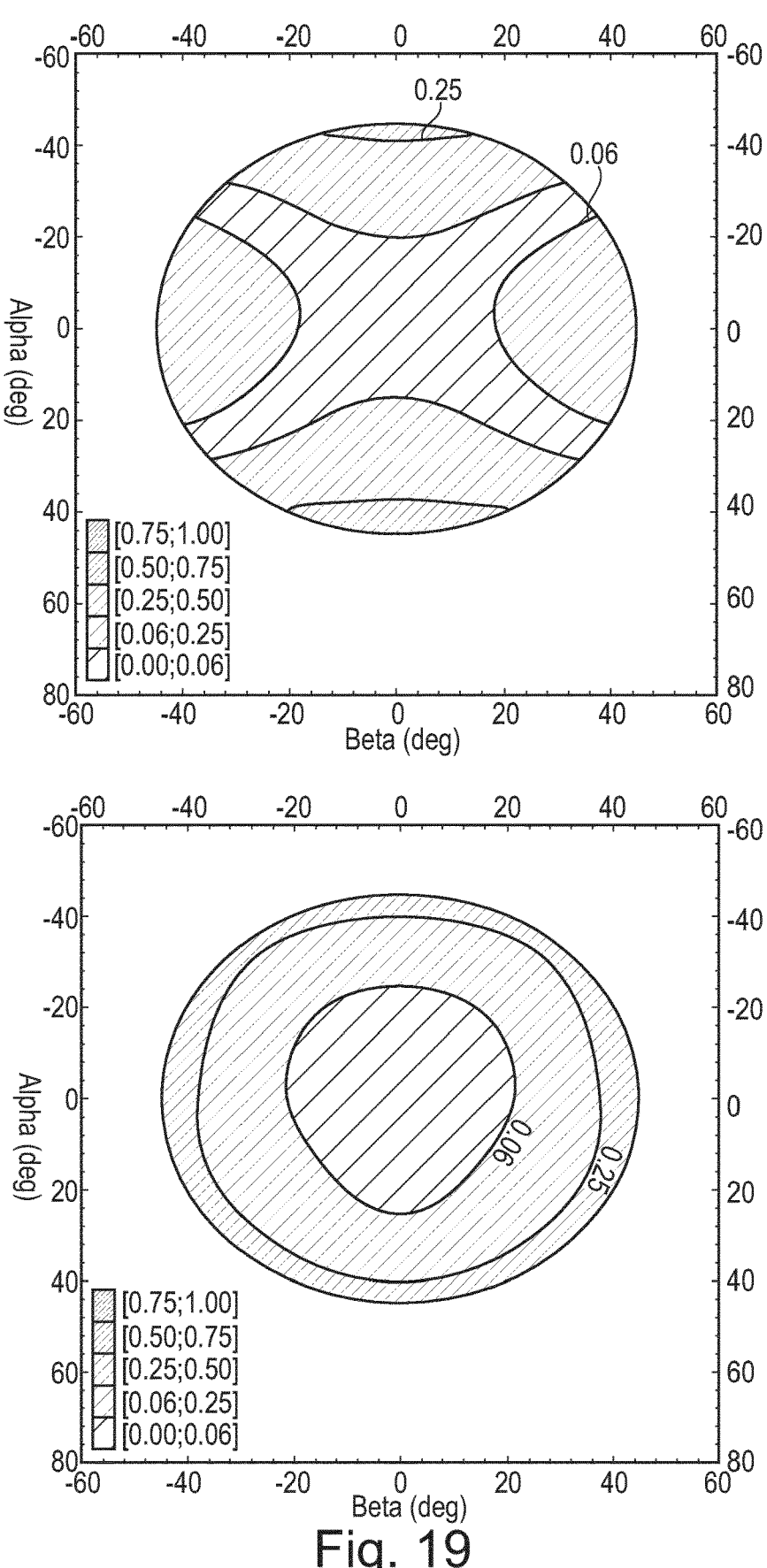
Figure 20:
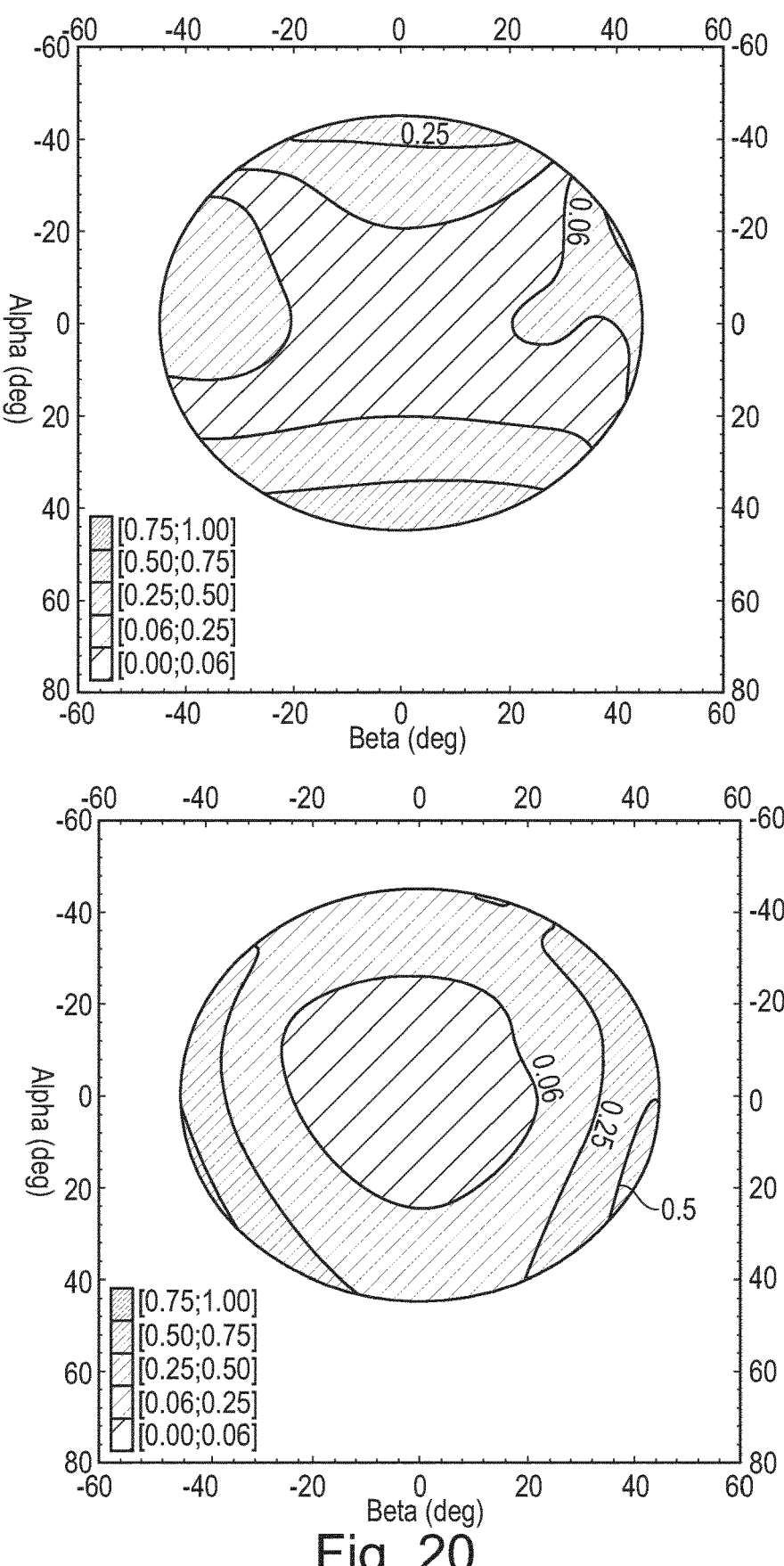

FIGS. 19 and 20 correspond to optical power and unwanted astigmatism diagrams for a single vision Tscherning based lens and an optimized optical lens.

The prescription is Sph=+2D; Cyl=−4D; and Axis=0°. The front surface radius is 112 mm.

FIG. 19 shows an optical power diagram and an unwanted astigmatism diagram of a Tscherning based lens, and FIG. 20 shows an optical power diagram and an unwanted astigmatism diagram of an optimized optical lens, where δpow=0.06D and δast=0.06D.

In the embodiment shown in FIGS. 19 and 20, r* of the Tscherning based lens as a value of 15°. The optimized intermediate lens r* has a value of 14.3° with a weighting cost function optimization. And the optimized optical lens r* has a value of 20.3°. If an initial sphero-toric lens with a front surface radius of 112 mm had been used, r* would only be 5.1°

The disclosure has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the disclosure, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the disclosure.

The invention claimed is:

1. A method implemented by a computer for determining an optical lens adapted for a wearer and optimized for at least a given optical criterion having a target value around a specific gaze direction, the method comprising:

obtaining an initial optical lens having in a specific gaze direction a prescription of the wearer in a given wearing condition; and performing two distinct optimizations:

a first optimization determining an intermediate optical lens by optimizing, using an optimization function, the initial optical lens so that a difference between the value of the at least given optical criterion of said intermediate optical lens and the target value of gaze direction around the specific gaze direction is smaller than or equal to a threshold value, and a second optimization determining the optical lens by optimizing the intermediate optical lens so as to obtain a largest zone of gaze directions around the specific gaze direction for which the difference between the value of the at least given optical criterion and the target value around the specific gaze direction is smaller than or equal to the threshold value, wherein the threshold value is defined by at least one wearer specific sensitivity parameter relative to the optical criterion, and each gaze direction is defined by a couple of angular parameters corresponding respectively to a lowering angle and an azimuth angle measured from a primary gaze direction, the zone of gaze directions being determined on an apex sphere centered on a center of rotation of an eye.

2. The method according to claim 1, wherein the initial optical lens has in the specific gaze direction the prescription of the wearer in the given wearing condition for a given object distance, when determining the intermediate optical lens, the initial lens is optimized for said object distance and when determining the optical lens, the intermediate optical lens is optimized for said object distance.

3. The method according to claim 1, wherein the at least given optical criterion is optical power or astigmatism or acuity or distortion.

4. The method according to claim 1, wherein the specific gaze direction is the primary gaze direction.

5. The method according to claim 1, wherein the optimization function used when determining the intermediate optical lens comprises a weighted cost function dependent on the gaze direction with a decreasing weight when an angle formed by a gaze direction and the specific gaze direction increases.

6. The method according to claim 1, wherein the optimization function comprises a penalization function used when determining the intermediate optical lens so as to ensure that in a defined zone of gaze directions around the specific gaze direction the difference between the value of the at least given optical criterion of said intermediate optical lens and the target value around the specific gaze direction is smaller than or equal to the threshold value.

7. The method according to claim 1, wherein the intermediate optical lens is determined by optimizing at least one surface of the initial optical lens.

8. The method according to claim 1, wherein the intermediate optical lens is determined by adding a Zernike layer to at least one surface of the initial optical lens.

9. The method according to claim 8, wherein the Zernike layer has an order greater than or equal to 4.

10. The method according to claim 1, wherein the optical lens is determined by optimizing at least one surface of the intermediate optical lens.

11. The method according to claim 1, wherein the optical lens is determined by adding a Zernike layer to at least one surface of the intermediate optical lens.

12. The method according to claim 1, wherein the optimization of the intermediate optical lens comprises a derivative-free optimization.

13. The method according to claim 1, wherein the zone of gaze directions around the specific gaze direction is centered on the specific gaze direction.

14. The method according to claim 1, wherein the zone of gaze directions around the specific gaze direction has a shape of a spectacle frame selected by the wearer and a size of the zone of gaze directions around the specific gaze direction is controlled using a homothetic transformation of said shape of the spectacle frame.

15. The method according to claim 1, wherein the threshold value is standard or customized depending on the wearer.

* * * * *